(12) United States Patent
Saxe et al.

(10) Patent No.: US 6,343,376 B1
(45) Date of Patent: Jan. 29, 2002

(54) SYSTEM AND METHOD FOR PROGRAM VERIFICATION AND OPTIMIZATION

(75) Inventors: James B. Saxe; Charles Gregory Nelson, both of Palo Alto, CA (US); David Detlefs, Westford, MA (US)

(73) Assignee: Computer Computer Corporation, Houston, TX (US)

( * ) Notice: Subject to any disclaimer, the term of this patent is extended or adjusted under 35 U.S.C. 154(b) by 0 days.

(21) Appl. No.: 09/176,950

(22) Filed: Oct. 22, 1998

(51) Int. Cl.[7] .................................................. G06F 9/44
(52) U.S. Cl. ................................. 717/9; 717/5; 706/14; 706/18; 706/20; 706/382
(58) Field of Search ....................... 717/4, 9, 5; 706/14, 706/18, 20, 382

(56) References Cited

U.S. PATENT DOCUMENTS

| | | | | |
|---|---|---|---|---|
| 4,914,590 A | * | 4/1990 | Loatman et al. | 364/419 |
| 5,142,590 A | * | 8/1992 | Carpenter et al. | 382/157 |
| 5,481,717 A | * | 1/1996 | Galboury | 717/4 |
| 5,511,146 A | * | 4/1996 | Simar, Jr. | 706/10 |
| 5,515,477 A | * | 5/1996 | Sutherland | 706/41 |

OTHER PUBLICATIONS

"Formal Methods Fact File VDM and Z", Andrew Harry, Chapter 7, Sep. 1996.*
"The Handbook of Brain Theory and Neural Networks", Michael A. Arbib, pp. 17–25,79–85,711–715, published 1995.*
"Three Models for the Description of Language", MIT, Noam Chomsky, Reprint from IRE Trans. Inform Theory, 1956.*
"A Front End Generator for Verification Tools", R. Cleaveland et al. p 201–215 Denmark Conference publication, May 1995.*
"Multi–Headed One–Way Automata", C. G. Nelson, Notices of the American Mathematical Society, v23,n4,PA444, 1976.*
"The Logic of Programming", E.C.R. Hehner, C.A.R. Hoare Series, Chapters 1–12, 1984.*
"Logic for Problem Solving", Robert Kowalski, Chapters 1–13, 1979.*
"Techniques for Program Verification", Nelson Charles Gregory, Stanford University PhD Thesis, 1980.*
"Formal Methods Fact File VDM and Z", Adrew Harry, Chapters 1,8 and Appendix B, 1980.*
"The Logic of Programming", Eric Hehner, CAR Hoare Series, TOC, pp. 158–169,270–273, 1984.*

* cited by examiner

*Primary Examiner*—Mark R. Powell
*Assistant Examiner*—Todd Ingberg
(74) *Attorney, Agent, or Firm*—Leah Sherry; Oppenheimer, Wolff & Donnelly LLP

(57) ABSTRACT

A system and method for increasing the speed of operation of a theorem prover relating to program verification using adaptive pattern matching technique is disclosed. Source code in a specific programming language is converted to one or more formulae, each representing a specific reformulation of the source code that facilitates program verification. Each formula derived from the source code is converted into an E-graph which is a particular type of a directed acyclic graph having leaf nodes and interior nodes. Some of the nodes of an E-graph may be related to other nodes through equivalence relationships. Equivalence relationships between a group of nodes is stored in a data structure called an equivalence class. A collection of rules defining the grammar of the programming language is stored in an axiom database. Rules and conjectures can dynamically be added to the axiom database. Each rule or conjecture to be tested is converted into a pattern. The task of proving a rule or verifying some or all of the source code is transformed to the task of matching a pattern associated with the rule against the nodes of the E-graph. After each round of matching, the E-graph is modified by the addition of new equivalence relationships.

64 Claims, 10 Drawing Sheets

SYSTEM AND METHOD FOR PROGRAM VERIFICATION AND OPTIMIZATION

TECHNICAL FIELD OF THE INVENTION

The invention relates to systems for program verification and automated theorem proving, and more particularly, to a static analysis technique for detecting errors in a software program.

DESCRIPTION OF RELATED ART

In the field of computer programming, it is often advantageous to check a software program statically, i.e., at compile-time, link-time or bind-time rather than at run-time. This enables a programmer to detect and correct certain types of errors prior to run-time, additionally saving the processing time and the consequences of running an erroneous program.

One of the techniques for static verification of a software program begins with a formula called a "verification condition" being derived from the program by a series of steps beginning typically with the parsing of the original program source code. A collection of terms occurring in the verification condition, optionally combined with a selected subset of terms occurring in an axiom set and terms derived from the verification condition or the axiom set is then represented by a particular kind of a directed acyclic graph (DAG) called an expression graph or E-graph. Such a static verification process ends with the analysis of the expressions in the E-graph using a set of rules. The rules define the ambit of the verification process and serve as the touchstone for measuring the correctness of a software program.

The analysis of the parsed expressions is conventionally performed using a set of rules reduces to the task of matching instances of various expressions in the E-graph against a set of prespecified patterns. This analysis is performed by a software program commonly referred to as a prover. Each of the prespecified patterns represent one or more rules. The instances of each of the patterns found in the E-graph is statically checked for formal correctness by the prover. As explored in greater detail elsewhere in this patent, the pattern-matching process that lies at the core of the prover becomes more complex in the presence of equalities.

Conventional provers, such as those used in prior program verification techniques, are often memory- and time-intensive because they use exhaustive search techniques. Furthermore, conventional provers do not generate adequate feedback when they fail to prove a conjecture, assertion or assumption. The lack of user-friendly reporting has reduced the usability and attractiveness of conventional provers.

It would therefore be desirable to have a prover that is both speedy as well as efficient in its use of memory resources. It would additionally be desirable to have a prover that could efficiently analyze a set of logical relationships to determine the truth or falsity of one or more assertions.

It has also been found desirable to have a prover analyze all or part of a computer program or other symbolic logical input using a set of formal rules that are themselves deduced from other parts of the program or input. The power and flexibility of a prover could be enhanced even further if it would accept user-supplied conjectures as well as internally generated working assumptions both statically as well as dynamically. It would additionally be useful to have a prover analyze computer source code or symbolic logical input using stored axioms from an axiom file or database.

It would be helpful if a prover were sensitive to the context of the analysis and distinguish between globally valid axioms, locally valid axioms and conditionally valid axioms. It would provide further utility if a prover used domain-specific algorithms for analyzing important functions and predicates such as arithmetic operators and the equality condition. It would be an added benefit if the pattern-matching techniques used in a prover were adaptable to other applications involving the matching of a graph against one or more patterns.

SUMMARY OF THE INVENTION

One of the principal problems addressed by the system and method of the present invention is to perform pattern matching (on an E-graph) in the presence of equalities. The system and method of the subject invention permits the prover input to be recursively-modified based upon prior prover output.

The present invention further aims at enhancing the power and flexibility of a prover by accepting user-supplied conjectures as well as internally-generated working assumptions both statically as well as dynamically. The present invention also provides further utility by using domain-specific algorithms for analyzing important functions and predicates such as arithmetic operators and the equality condition.

In one aspect, the present invention includes a technique for increasing the speed of operation of a theorem prover relating to program verification using adaptive pattern-matching. Source code in a specific programming language is converted to one or more formulae, each formula representing a specific reformulation of the source code that facilitates program verification. Each formula is converted into an E-graph which is a particular kind of a directed acyclic graph having leaf nodes and interior nodes connected by directed and/or undirected edges.

Certain of the formulae may be such that the E-graph associated with a formula may not be fully active for the purposes of the pattern-matching process. In the discussion that follows, the "active" portion of an E-graph refers to the part(s) of the E-graph over which the pattern matching process of the present invention executes. The pattern-matching process of the present invention is not performed on the "inactive" nodes of the E-graph. It should be emphasized that the set of "active" nodes of an E-graph can change dynamically during the operation of the present invention.

Some of the nodes of an E-graph (which are also referred to as E-nodes) may be related to other E-nodes through equivalence relationships. Equivalence relationships between groups of E-nodes are stored in a data structure which is referred to as an equivalence class. A collection of rules defining the semantics of the programming language is stored in an axiom database. Rules and conjectures about the source code may also be added to the axiom database during the analysis. Each rule and conjecture to be tested is first converted into a pattern.

The task of proving a rule or conjecture or verifying some or all of the source code is thus transformed into the task of matching the pattern associated with the rule or conjecture against the active nodes of the E-graph (i.e. the nodes corresponding to the appropriate portion of the source code). It should be noted that in the preferred embodiment of the present invention, the prover "proves" each rule or conjecture by attempting to disprove the negated rule or conjecture. In one implementation, this is done by combining the negated rule or conjecture with associated active portion of the E-graph into a data construct called the "context." The prover attempts to disprove the negated rule or conjecture by looking for internal inconsistencies or contradictions in the constructed context.

The pattern-matching process at the core of the prover begins with a comprehensive search over the entire E-graph for the plenary set of patterns. This comprehensive baseline search is referred to as the first round of matching. After the initial round of matching, the E-graph may be modified by the addition of new nodes or equivalence relationships. The search for internal inconsistencies is repeated anew after each modification to the E-graph. These subsequent searches through the E-graph are referred to as Round 2 of matching, Round 3 of matching, etc. After each round of matching, the E-graph may be modified by the addition of new nodes or equivalence relationships or the activation of dormant nodes. It should be noted that an E-graph is typically invariant during a round of matching.

The efficiency of the pattern-matching process can be improved by limiting the search (using knowledge about the changes, if any, made to the E-graph after the previous round of matching) to only those portions of the E-graph and those patterns which may be relevant to the subsequent rounds of matching. The first type of optimization, i.e. restricting the search to only those portions of the E-graph where new matches may plausibly be found is performed using the mod-times optimization technique. The second type of optimization, i.e. restricting the search to only those patterns that may plausibly result in new matches being found in the modified E-graph is performed using the pattern-element optimization technique.

The mod-times optimization technique increases the efficiency of the pattern-searching process by time-stamping the changes to various regions of the E-graph. The pattern-element optimization permits an additional increase in efficiency by indexing the connection relations between the nodes of the E-graph to speed up the correlation of the structure of an E-graph with a pattern being searched.

These two optimizations, which may be used in any application that may be mapped or reduced to the task of matching or searching for a pattern in a graph, lie at the core of the present invention. It should be emphasized that the mod-times optimization technique and the pattern-element optimization technique are independent of each other. Thus each of them can be used or applied separately or conjunctively as needed. It should be reiterated that the present prover can also be used for applications other than program verification, e.g., in symbolic algebra.

The present invention permits and facilitates the verification of information. This includes the automated verification of the accuracy of a computer program or the automated proving of a theorem regarding symbolic logic relative to a set of externally-generated rules about the syntax and semantics of the computer program or symbolic logic. In this regard, all or part of a computer program or symbolic logic is selectively transformed into one or more formulae. The generated formulae are designed to be amenable to automated testing against one or more of the externally-generated rules.

Formula handlers can be included to generate an initial E-graph from the formula. Each of the nodes of the E-graph (i.e. the E-nodes) represents either a constant term, a variable term or an algebraic or logical operator.

Each of the rules in the set of externally-generated rules may, in accordance with still further aspects of the invention, be converted into one or more distinct search patterns. It should be noted that the set of externally-generated rules may be dynamically added to and/or modified during the analysis. Further, some of the rules may be converted into multiple distinct search patterns, called multi-patterns. Each active E-node of the initial E-graph may be searched using a pattern-matching algorithm to detect instances of the pattern. Information about any new matches that are found are stored in a data structure.

After each round of searching, the E-graph can be selectively modified to add or activate additional nodes and/or additional equivalence relationships to some or all of the nodes of the modified E-graph. This is followed by identification of those regions of the modified E-graph that may be relevant to the search. The identified regions of the modified E-graph are searched for instances of the search pattern. These last three steps are repeated until no new matches are found in the active portion of the E-graph for the complete set of search patterns.

The identification of certain regions of the modified E-graph as being relevant to a search for a distinct search pattern can be performed in at least two ways. The first technique involves maintaining information about when each of the nodes in the active portion of said E-graph was last modified or affected. If the search pattern is a multi-pattern, then this technique uses the earliest modification time of all of the patterns of the multi-pattern as a gating term to determine the effective modification time for the multi-pattern.

The second technique for increasing the efficiency of the search process involves selective pattern matching based upon the nature of an event triggering a change in the E-graph. There are at least two such significant triggering events: the merger of two or more equivalence classes, and the activation of previously inactive E-nodes in an E-graph.

The efficiency of the search process can be significantly improved by indexing all pairs of function symbols in each search pattern that are parent-child pairs. As would be expected, each parent-child pair of function symbols comprises a parent function symbol and a child function symbol. A parent-child function symbol pair is characterized by an application of the child function symbol in the search pattern also being an argument of the parent function symbol in the same search pattern.

The relevance of a merger of two or more equivalence classes to the match process for a distinct search pattern is established when the merger causes some active application of the child function symbol becoming equivalent to some active argument of the parent function symbol. The indexed information about all the parent-child pairs in the active portion of an E-graph is stored in a data structure called a global parent-child (gpc) set.

A similar indexing can also be performed for all parent-parent pairs of function symbols in each search pattern. A parent-parent function symbol pair is characterized by the two parent function symbols being independently applied to two distinct occurrences of a common pattern variable in the search pattern.

The relevance of a merger of two or more equivalence classes to the match process for a distinct search patterns is established when the merger causes some active argument of one of the parent function symbol becoming equivalent to some active argument of the other parent function symbol. The indexed information about all parent-parent pairs in the active portion of an e-graph is stored is a data structure called the global parent-parent (gpp) set.

As mentioned earlier, the second type of significant triggering event is the activation of previously inactive E-nodes in an E-graph. In this case too, the efficiency of the search process can be significantly improved by updating the parent-child and parent-parent function symbol pair indices for each of the search patterns. This updating is performed to incorporate the effect of activating certain inactive E-nodes. In addition, a global set of trivial parent elements in the active portion of the E-graph is maintained and updated to reflect the activation of the erstwhile inactive E-nodes.

The global parent-child function pair set, the global parent-parent function pair set and the trivial parent function element set can be formed using approximate sets. A 64-bit hash function can advantageously be used to implement these approximate sets.

BRIEF DESCRIPTION OF THE DRAWINGS

A more complete understanding of the present invention may be obtained by reference to the detailed description of the preferred embodiments that follows, taken in conjunction with the accompanying drawings, wherein.

DESCRIPTION OF THE PREFERRED EMBODIMENT

Figure 1:
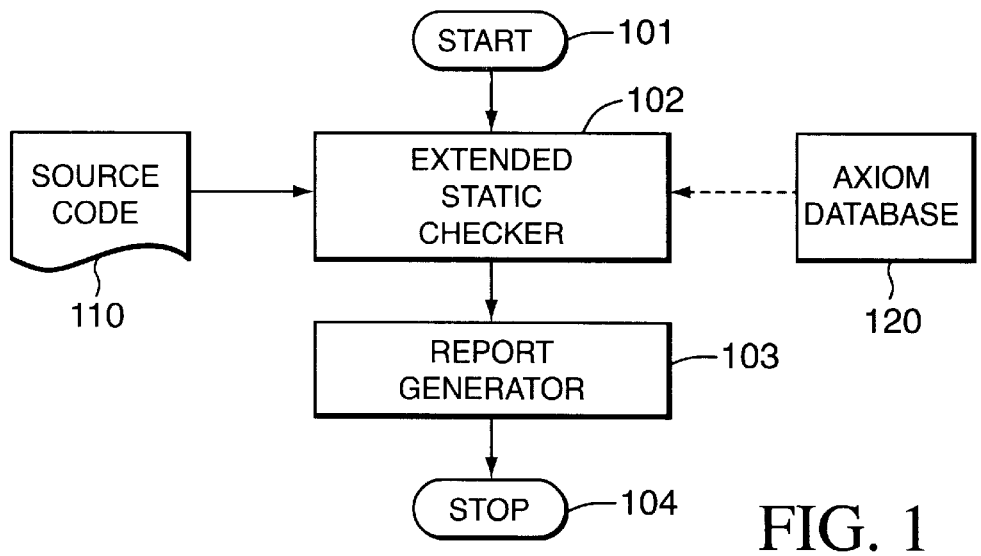
FIG. 1 is a high-level block diagram of the extended static checker of the present invention.

FIG. 1 is a high-level block diagram of the extended static checker system and method of the present invention. As shown in FIG. 1, the process starts at 101 followed by executing the extended static checker 102 in a computer system. The extended static checker 102 accepts as input the source code 110 that is to be analyzed using rules stored in an axiom database 120. Based upon the analysis of the source code 110, the extended static checker 102 transmits the analysis results to the report generator 103.

The report generator 103 provides significant additional functionality and capability for user interaction compared to prior theorem provers and static program verification systems. If the extended static checker 102 finds that the source code 110 to be formally correct (or fails to determine that the source code 110 is incorrect), then the report generator 103 reports to the user that the source code appears to be syntactically accurate based upon the rules about the programming language or symbolic input stored in the axiom database 120.

If, on the other hand, the extended static checker 102 detects one or more errors or inconsistencies in the source code 110, then the report generator 103 informs the user about the source and the nature of the error and provides guidance to correct the error condition. After generating the appropriate report, the process comes to an end as shown at 104.

Figure 2:
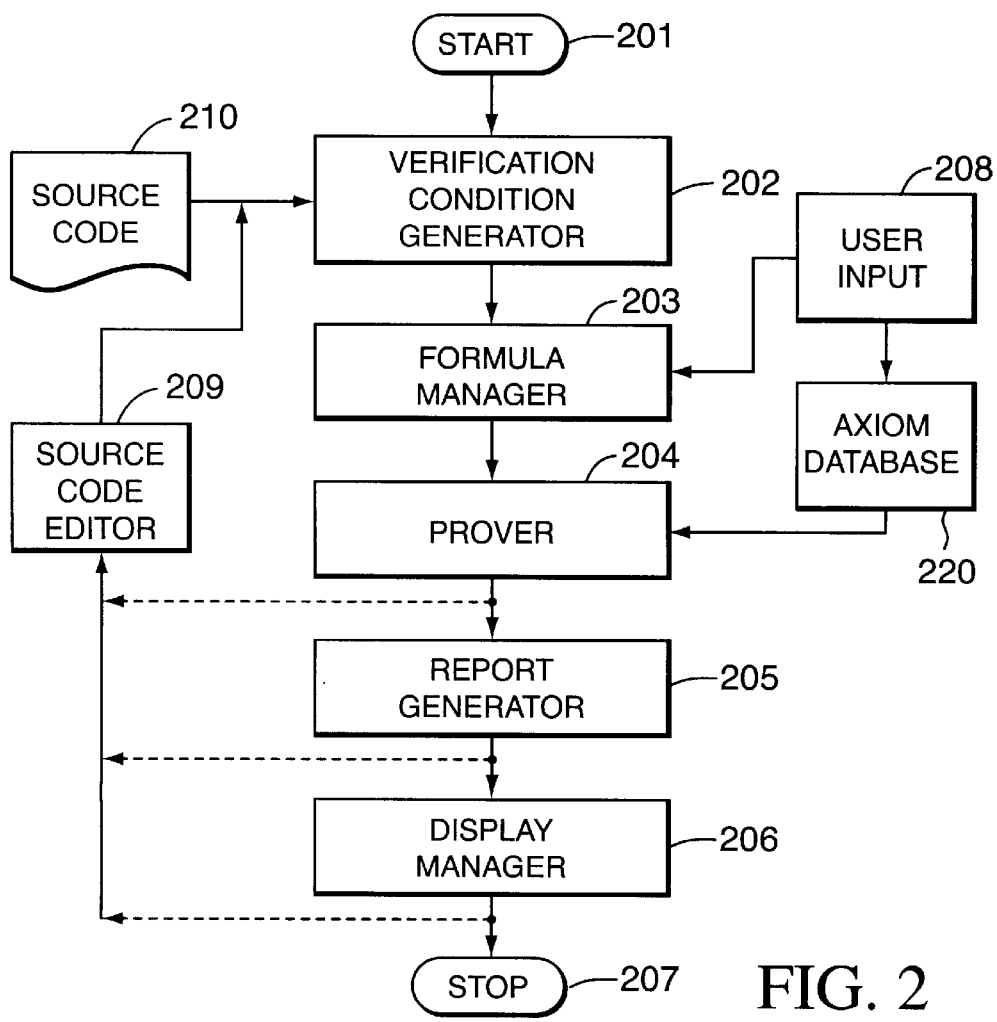
FIG. 2 is an intermediate-level block diagram showing the relationship between the various software modules in the static checker of FIG. 1.

Additional details about the system and method of the present invention can be obtained from FIG. 2 which is an intermediate-level block diagram showing the relationship between the various software modules in the preferred embodiment of the present invention. As can be seen, the process starts at 201 with the source code 210 being input through the verification condition generator 202.

The verification condition generator 202 converts the raw source code or other symbolic input into formulae that are to be verified. These formulae, which are also sometimes referred to as verification conditions (VCs) 230, are then provided to a formula manager 203. It should be emphasized that a single source code may result in a multitude of verification conditions or formulae. Furthermore, formulae can vary in complexity from simple expressions to expressions of substantial complexity.

The formula manager 203 is responsible for generating an initial graphical representation of the verification condition by generating a tree-like graph structure called an E-graph 240. It should be emphasized that the verification condition generator need not be the only source of formulae which serve as inputs to the prover 204.

As can be seen in FIG. 2, the formula manager 203 may also receive direct user input as shown at 208. It should be noted that the user input 208 can comprise both conjectures (i.e., a logical expression that is to be analyzed) as well as axioms (i.e., one or more rules to analyze the logical expression). Various formal rules are stored in the axiom database 220. As shown in FIG. 2, the axiom database may also be revised or updated based upon user input 208.

The initial E-graph 240 generated by the formula manager 203 is then presented to the prover 204 along with one or more axioms from the axiom database 220. The prover 204 sequentially analyzes the initial E-graph using the axioms from the axiom database 220. The process of analysis performed by the prover 204 is essentially a pattern matching process interleaved with symbolic manipulations and extensions of the E-graph 240.

If the prover 204 finds that the application of an axiom $X_1$ from the axiom database 220 results in an error condition or inconsistency being detected in the formula being tested, then the prover data is communicated to the report generator 205. The report generator in turn transmits this data to a display manager that optionally formats the information in a user-friendly manner, as shown at 206.

If the prover 204 does not find any inconsistency in a formula relative to a specific applied axiom, it repeats the entire process using the next axiom in the axiom database that is relevant to the analysis task being performed. If all of the axioms in the axiom database or any other conjectures being tested are all found to have been correctly applied, then the round of matching comes to an end. The E-graph is then augmented or modified and a new round of pattern matching commences. If the prover 204 determines (based upon its incorporated heuristics regarding the utility of searching a specific region of the E-graph or searching for a particular pattern) that there are no regions of the current E-graph (as modified or augmented) or patterns worth searching for, then the prover generates a data signal 250 to the report generator 205, indicating that no formal errors have been found in the source code 210. This information is relayed to the user using the display manager 206 as before and the process then ends as shown at 207.

In an extension of the present invention, detection by the prover 204 of an error or inconsistency in the formula being analyzed permits the output of the prover to be used as the basis for assisted amelioration or elimination of the diagnosed formal error, as shown at 209. The edited source code may optionally be fed back to the verification condition generator 202, causing the process to repeat from the beginning as described earlier.

In the preferred embodiment of the present invention, the prover 204 is optionally given a set of axioms and a conjecture to prove. Typically, the conjecture is a formula that is generated mechanically from a source code 210 and that expresses the conjecture that the source code 210 is free of certain kinds of errors, i.e., that these errors will not occur at run time. The prover begins by producing a set of internal data structures representing the negation of the conjecture—and thus representing the supposition that one or more of these errors can occur in the source code 210 being checked when it is analyzed in conjunction with the axiom set.

The task of the prover is thus to either show that this negated formula is inconsistent with one or more of the axioms (i.e. indicating the absence of a class of errors in source code 210) or to find a set of conditions under which the negated formula could plausibly be true (thus indicating the conditions under which the source code 210 could plausibly produce a run-time error).

The internal data structures representing the negated conjecture includes, inter alia, an E-graph and is collectively referred to as the "context." Once again, it should be noted that since the context represents the negated conjecture (optionally in combination with one or more of the axioms from the axiom set), deriving a contradiction from the context is a way of showing the correctness of the original conjecture, and thus, a way of showing the absence of a class of errors in the source code 210.

Among the techniques used by the prover to show that a specific context is inherently contradictory, two are of particular interest for purposes of the present invention. The first of these two techniques is called the matching technique while the second is referred to as the case-splitting technique. Each of these two techniques is discussed below in greater detail.

In the matching technique, the prover 204 updates the context to represent a specific instance of an axiom—if updating is indicated by the successful matching of a pattern in the E-graph. The updating of the context can occur in many ways, e.g., by adding new nodes to an existing E-graph, by activating nodes that are already part of an existing E-graph, or by merging "equivalence classes" in the E-graph, amongst other possibilities. It should be emphasized that each axiom may either have been derived from a negated conjecture or have originated from a separate axiom file.

Sometimes the process of updating of the context may lead directly to the detection of a contradiction. An illustrative example could be a situation where the prover requires two distinct equivalence classes in the E-graph to be merged into one even though it is known a priori that the two distinct equivalence classes contain nodes that represent unequal values. Another such situation arises when the updating of a context enables a series of inferences to be drawn sequentially (possibly interspersed with additional rounds of matching) that in turn leads indirectly to the detection of a contradiction.

The case-splitting technique permits the prover 204 to detect some contradictions that are inherent in a constructed context. The use of the case-splitting approach has been found to be especially useful for certain axiom instances. In general terms, the technique begins with the identification of a condition C to perform the case-splitting analysis.

The key aspect of the case-splitting technique is to show that for the selected condition C, the context when combined with the assumption that the selected condition "C is true" is internally inconsistent. If, at the same time, the context when combined with the assumption that the selected condition "C is not true" is found to be internally inconsistent, it would show that the context being tested by the prover 204 is absolutely inconsistent. It should be noted that the condition C may, for example, be a condition mentioned somewhere within the negated conjecture itself, or may occur as part of some axiom instance.

In the preferred embodiment of the present invention, the case-splitting technique can be described algorithmically as follows:

a. Select a condition "C" with which to test a code fragment with using the case-splitting technique.

b. Modify the context (including the associated E-graph) to reflect the assumption that the condition C is true.

c. Recursively attempt to show that the modified context is internally inconsistent.

d. Restore the context (including the associated E-graph) to its original state (i.e. its state prior to the modification performed in step b).

e. Modify the context (including the associated E-graph) to reflect the assumption that the condition C is not true.

f. Recursively attempt to show that the modified context is also internally inconsistent.

It should be noted that the use of the second technique (case-splitting) periodically requires the restoration of an E-graph to an earlier state, as noted elsewhere in this document.

In certain situations, typically occurring after a number of levels of case-splitting interleaved with one or more rounds of matching, the prover 204 may not be able to identify any condition "C" that seems appropriate for a case-splitting consistency investigation, any axiom instance that seems worth asserting, or any other promising technique for detecting or demonstrating the existence of internal inconsistency in the context.

In such a situation the prover 204 generates a report raising the possibility that the negated conjecture may indeed be satisfiable and transmits this along with information about the conditions that hold true in the case being analyzed. It should be noted that if the initial conjecture is equivalent to the assertion that the source code is free of certain kinds of errors, then a report detailing a possible way of satisfying the negated conjecture is equivalent to the identification of a situation in which executing the source code may generate a run-time error.

If, on the other hand, the prover 204 finds that every pair of cases investigated leads to the detection of internal inconsistency in the associated pair of modified contexts, it then follows that the negated conjecture is inherently unsatisfiable. Consequently, this leads to the conclusion that the original (nonnegated) conjecture is true, i.e., indicating the absence of a certain class of errors in the source code being checked.

Introduction to Terminology

Figure 3:
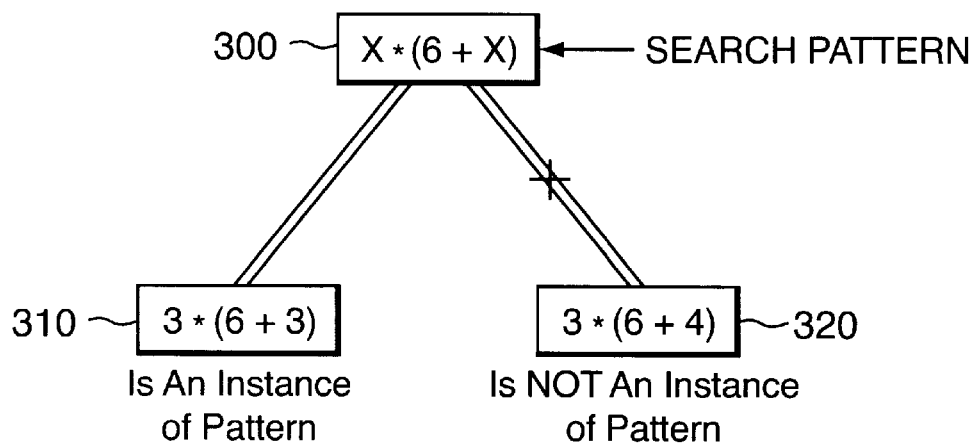
FIG. 3 is an exemplary illustration of the concept of an "instance" of a search pattern.

Prior to a detailed consideration of the present invention, it will be useful to define some of the terminology used herein. FIG. 3, is an exemplary illustration of the concept of an "instance" of a search pattern. A pattern can be defined as comprising one or more terms combined by operators into an expression. The arguments can be constants or variables. Thus, the pattern $X*(6+X)$ is an expression containing the variable X, the constant "6 ", and operators "*" and "+." This is depicted in FIG. 3 as search pattern 300. An instance of such a search pattern is said to occur when each variable in a search pattern corresponds consistently with an analogous variable, constant or sub-expression in the instance.

For example, the expression $3*(6+3)$ is an instance 310 of the search pattern $X*(6+X)$ 300 with the variable X being replaced by the constant 3. However it would be obvious to those of ordinary skill in the art that the expression $3*(6+4)$ is not an instance 320 of the search pattern $X*(6+X)$ 300. This has been illustrated in FIG. 3.

An example source program statement could be:

IF (A/(B*B)>6)
THEN INVOKE PROC1 (P1, P2, P3)
ELSE INVOKE PROC2 (P1, P4, P5)

Prior to the compilation or execution of such a program statement, it is useful to first verify that the term B*B is nonzero, since division by zero would cause an error in the program. A fact (or axiom) available to the static checker could be that for all real values of X, X*X is always nonnegative. However, in order to use and apply such an axiom, the static checker needs to be able to identify the term B*B as being an instance of the pattern X*X.

Figure 4:
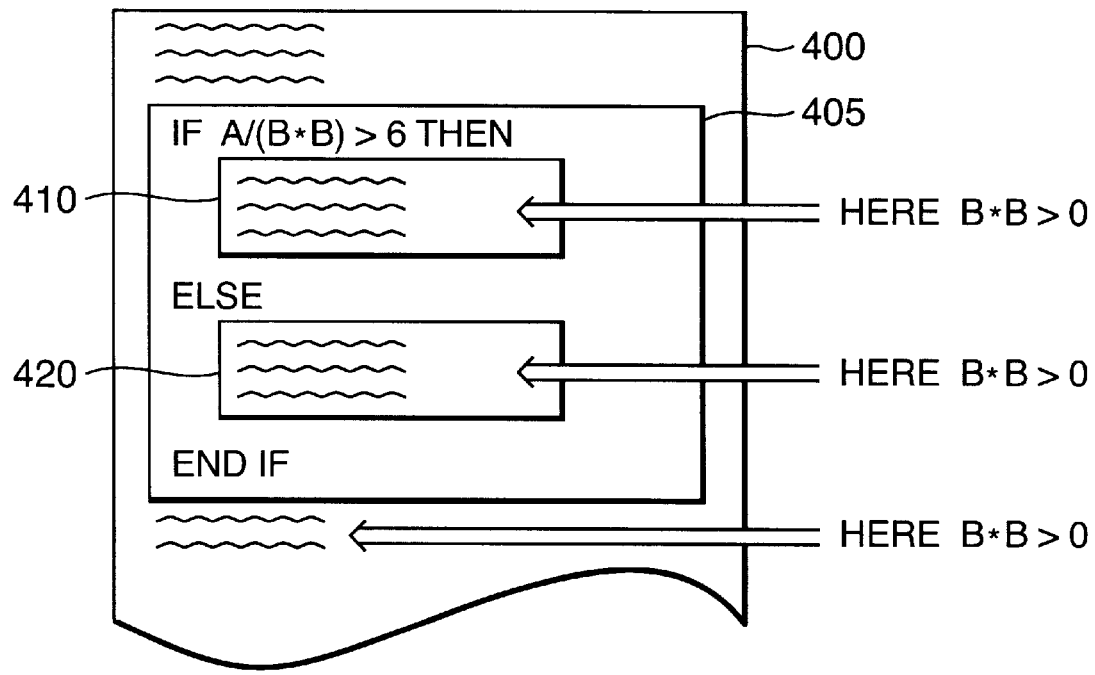
FIG. 4 illustrates the notion of a global axiom.
Figure 5:
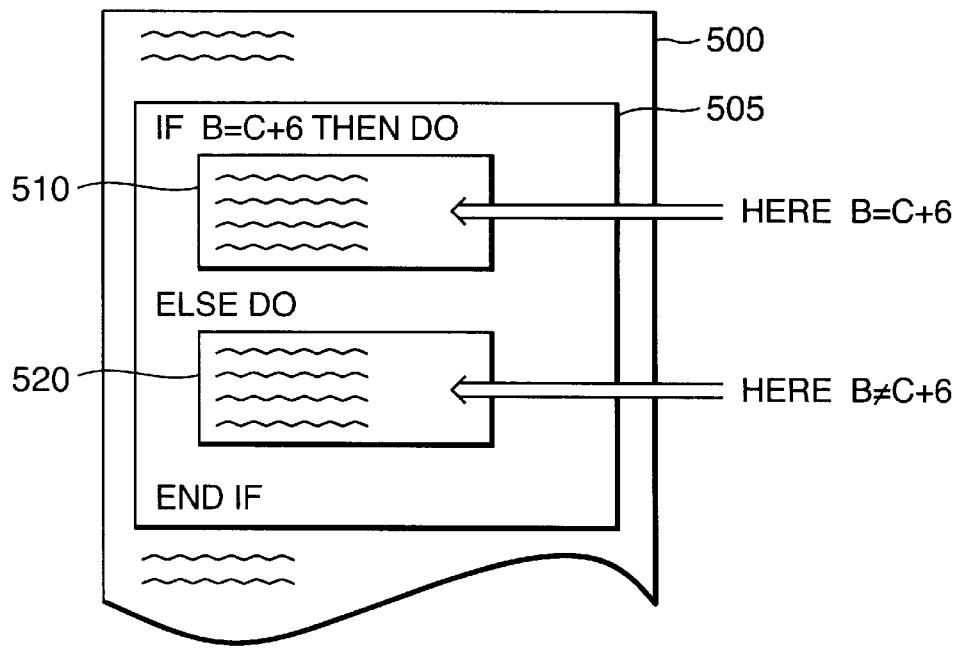
FIG. 5 illustrates the notion of a local axiom.

FIGS. 4 & 5 illustrate the concept of an "axiom" or "rule" for purposes of program verification. In order to gauge the correctness of a program, one needs a yardstick to measure conformity. Axioms serve this purpose in a program verification environment. Axioms may be global (i.e., context-insensitive) or local (i.e., context-sensitive).

FIG. 4 illustrates the notion of a global axiom. Consider the section of the source code 400 that is shown in FIG. 4. The source code 400 includes an IF block 405, which if true, causes the code fragment 410 to be executed. To properly execute, it is important that B*B be non-zero.

Since for real values of B, B*B is always greater than or equal to zero, a verification condition set up to avoid division errors is likely to determine whether the denominator term in the test condition of the IF block 405 is non-zero. Consequently, B*B would be greater than zero during the execution of the code fragment 410. In the example shown in FIG. 4, the same condition also holds for code fragment 420, even though it is part of the ELSE branch of the IF block 405.

Provided that the value of B is not further manipulated after the end of the IF block 405, B*B will continue to be greater than zero after the end of the IF block 405, as shown in FIG. 4. Thus, the condition B*B>0 would likely continue to be true at later positions in the source code provided the value of B was not modified by another operation. An even stronger global axiom that could apply to the entire source code 400 could be that B*B>0 because that is an axiomatic property of real numbers.

FIG. 5 illustrates the notion of a local axiom. In FIG. 5, the source code isd depicted as block 500. Assuming that the IF block 505 has the structure as shown in FIG. 5, with the test condition B=C+6 being the basis for determining whether the THEN block 510 or the ELSE block 520 is executed. Obviously the condition B=C+6 is true inside the IF block 510 and is false in the ELSE block 520. Thus, the axiom B=C+6 is true for the code block 520.

Figure 6:
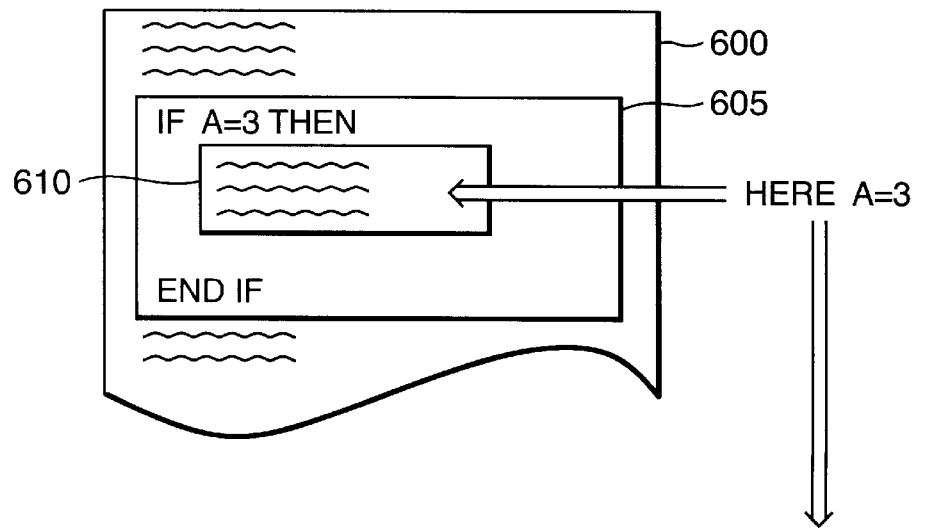
FIG. 6 shows the creation of an instance of a pattern by the assertion of an equivalence relationship.

FIG. 6 shows the creation of an instance of a pattern by the assertion of an equivalence relationship. Conventional matching sometimes involves the use of asserted equalities to find instances of patterns. For example, the expression $A*(6+3)$ is ordinarily not an instance of the pattern $X*(6+X)$. However, as illustrated in FIG. 6, if a program segment 600 were to contain the following statement:

IF A=3 THEN PERFORM Action1, then the program commands 610 comprising Action1 would need to be analyzed when the equality A=3 is true. Thus the equality A=3 would be added to the appropriate E-graph (discussed in greater detail later) and would result in the expression $A*(6+3)$ becoming an instance of the pattern $X*(6+X)$.

In program verification systems, both the expressions and equalities can be represented in graphical format known as an E-graph. Details about the structure and format of an E-graph can be obtained by reference to the Ph.D. thesis of Charles Gregory Nelson, one of the co-inventors of the present invention, republished in CHARLES GREGORY NELSON, TECHNIQUES FOR PROGRAM VERIFICATION, Xerox Palo Alto Research Center Technical Report No. CSL-81-10 (June 1981).

In summary, the nodes of an E-graph represent expressions and sub-expressions. An E-graph includes nodes that are labeled with operators occurring in the expression and other nodes that are labeled with arguments of the operators. The nodes in an E-graph are referred to as E-nodes. It should be noted that the arguments of an E-node are also E-nodes. The operator nodes of an E-graph are connected by directed edges to the argument nodes of the E-graph. Undirected edges connect expressions known to be equal. The undirected edges may connect any two E-nodes. These undirected edges are indicated by broken lines in the figures of this patent.

Figure 7:
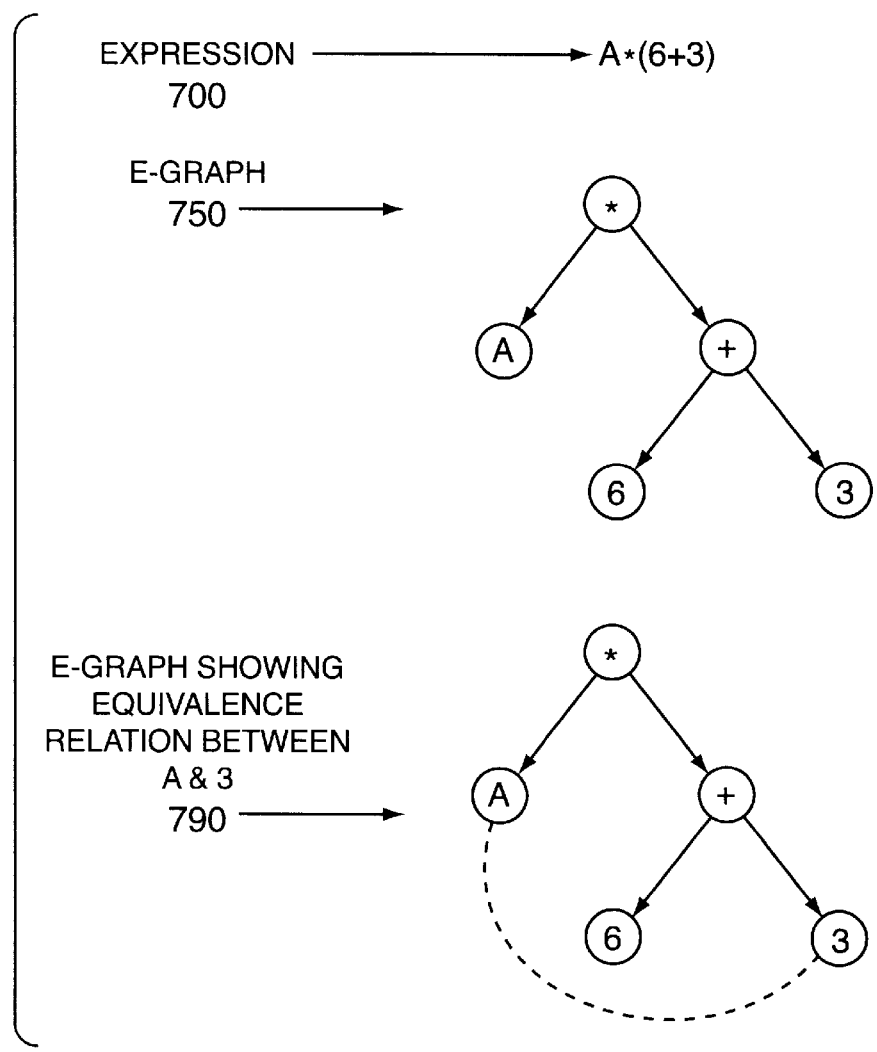
FIG. 7 shows an E-graph with an equivalence relationship between two leaf nodes.

Consider the expression 700 as discussed above. The expression 700 can be converted into the E-graph 750 shown in FIG. 7. This E-graph comprises a top-level (root) node "*" 751 that is connected by directed edge 752 to leaf node "A" 753 and node "+" 754. The "+" node 754 is connected to two nodes "6" and "3". The nodes labeled A, 6, and 3 are called leaf nodes, while the nodes labeled "*" and "+" are referred to as interior nodes.

Figure 8:
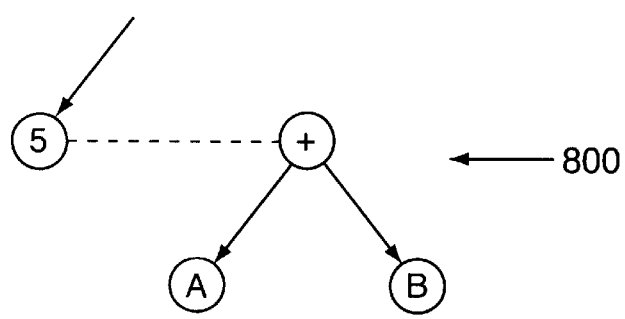
FIG. 8 shows an E-graph with an equivalence relationship between a leaf node and an interior node.

The equality A=3 is shown by the undirected edge in modified E-graph 790. It is important to emphasize that equivalence relationships are not limited to leaf nodes. This is illustrated in FIG. 8 where a leaf node labeled "5" of some other subgraph has an equivalence relationship with the interior node labeled "+" 754 in FIG. 8.

Figure 9:
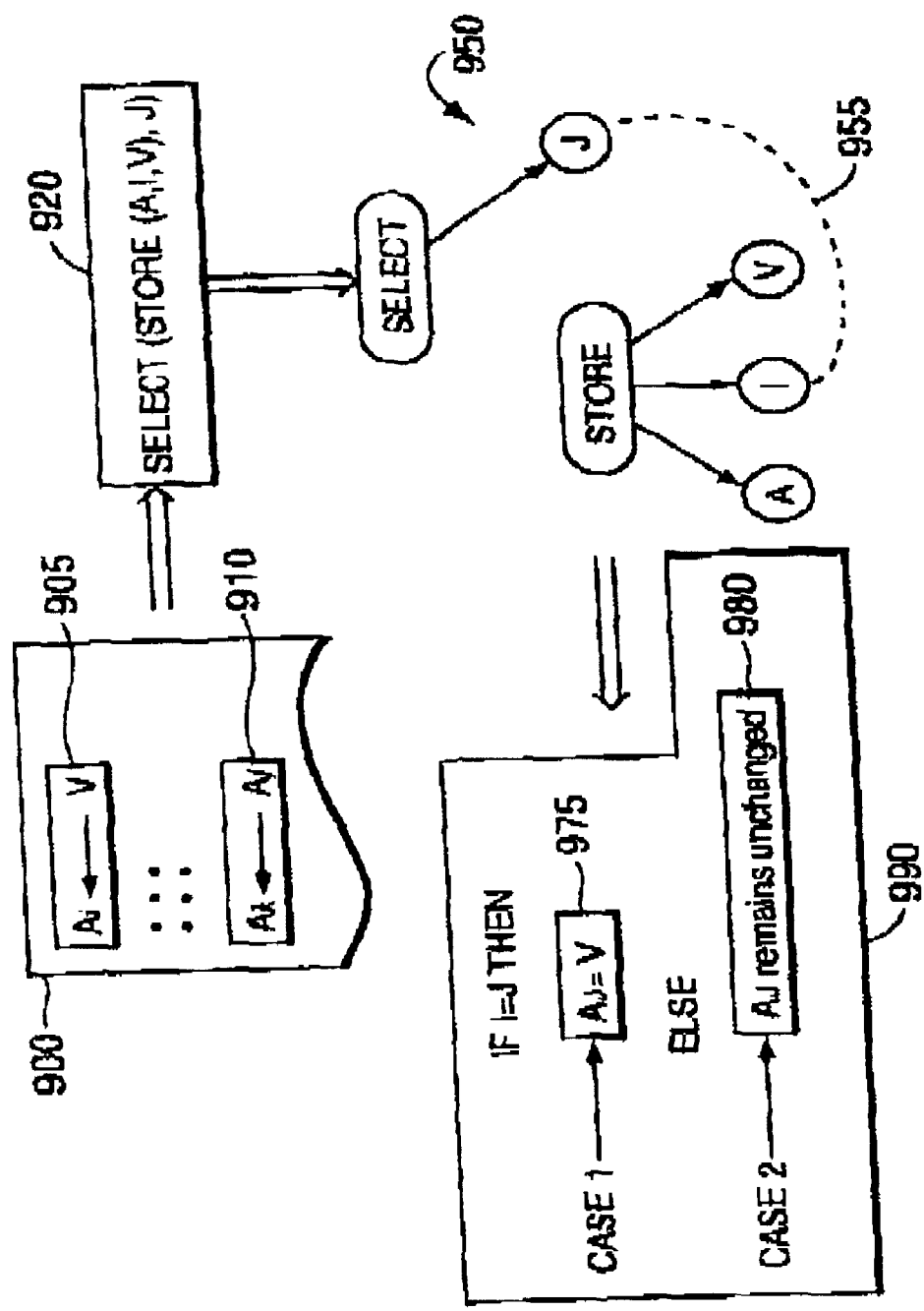
FIG. 9 provides a high-level overview of the process of transforming source code using the verification condition generator and a prover to verify a conjecture about the program.

FIG. 9 provides a high-level overview of the process of transformation of source code 900 into a formula 920 and then via an E-graph 950 with an equivalence relation 955 to the logical conclusion 990. The fragment of the source code 900 shown in FIG. 9 comprises two statements $A_i \leftarrow V$ and another statement $A_k \leftarrow A_j$. These statements could be converted into the formula SELECT(STORE(A,I,V),J)) as shown at 920.

The formula manager generates the initial E-graph 950 having at its highest root level the SELECT node connect to two child nodes: a node labeled "J" and a node labeled "STORE". The STORE node, in turn, has three child nodes: an "A" node, an "I" node, and a "V" node, as shown in FIG. 9.

If the equivalence relationship I=J were added to the E-graph 950, we notice that the analysis of the code fragments now has to consider at least two cases. The first case is when I=J. In this case, the value of $A_j$ is equal to V, the value of $A_i$. This is shown as Case 1 at 975. Alternatively, if I≠J, then the value of $A_j$ would remain unchanged from whatever it was prior to step 905. This is shown at 980 as Case 2.

It should be emphasized that one of the principal problems addressed by the system and method of the present invention is to perform pattern matching (on an E-graph) in the presence of equalities. Prior to a detailed analysis of how this is done, it would be useful to appreciate one of the fundamental properties of the equality relationship, namely that it is "closed under congruence."

Figure 10:
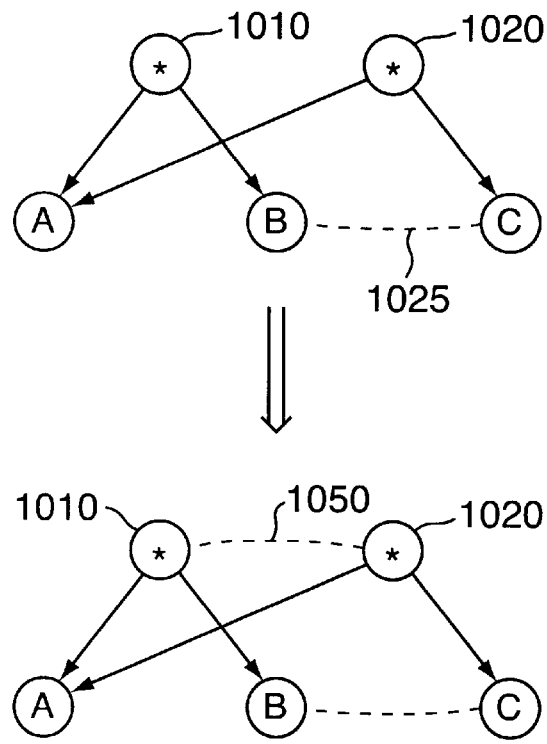
FIG. 10 illustrates that equality is closed under congruence.

To explain this concept, consider the expressions A*B and A*C indicated by nodes in FIG. 10A. If B=C, as shown by the undirected edge 1025, then it follows that A*B=A*C. Consequently, if node B and node C belong to the same equivalence class, as indicated by edge 1025, then it follows that node 1010 and node 1020 are also members of the same equivalence class, as indicated by edge 1050 in FIG. 10B.

Figure 11:
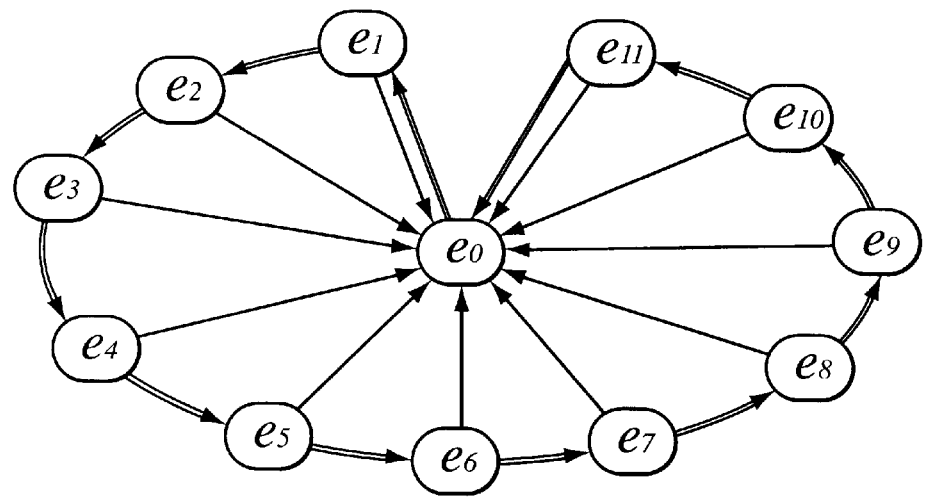
FIG. 11 shows the data structure for members of an equivalence class.

FIG. 11 illustrates the data structure used for storing information relating to various elements of an "equivalence class." As explained earlier, all members of an equivalence class have equal values. As shown in FIG. 11, each member of an equivalence class contains two pointers. The first pointer, called the root pointer, points toward a common root node. This is illustrated in FIG. 11 where each of the elements $e_1, e_2, e_3, e_4, e_5, e_5, e_6, e_7, e_8, e_9, e_{10}$ and $e_{11}$ all point toward the common root node $e_0$. The analogous pointer of the root node $e_0$ points toward itself. In addition all the elements of the equivalence class are joined together into a linked list by a second pointer that points to the next element in the linked list.

The use of the root node pointer permits an easy comparison of different elements for equality: if two elements have a common root element, then the two elements are equal. The linked list, on the other hand, permits the list to be traversed. Consequently, such a data structure permits both easy comparison as well as traversal.

A key step of the present analysis is to search an E-graph having an equivalence relationship imposed on some of the nodes, in order to detect a pattern stored in the axiom database or a pattern derived from a verification condition. In order to search the E-graph, the prover 204 traverses a set of E-nodes and invokes a match function at each of the E-nodes, additionally providing a known pattern as an argument to the match process at each of the E-nodes.

The simplest form of searching through the E-graph would invoke the match function exhaustively for each of the patterns at each of the E-nodes. Quite predictably, this can be quite time-consuming (i.e., inefficient) especially when the number of E-nodes and the number of match patterns are large. Consequently, it would be desirable to perform the match selectively on the relevant subset of E-nodes using a relevant subset of match patterns.

Figure 12:
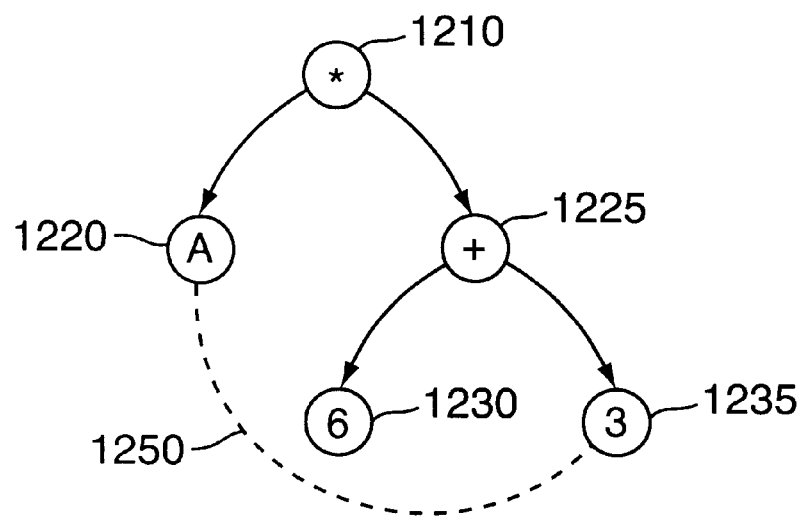
FIG. 12 illustrates the implementation of the matching procedure of the present invention.
Figure 12:
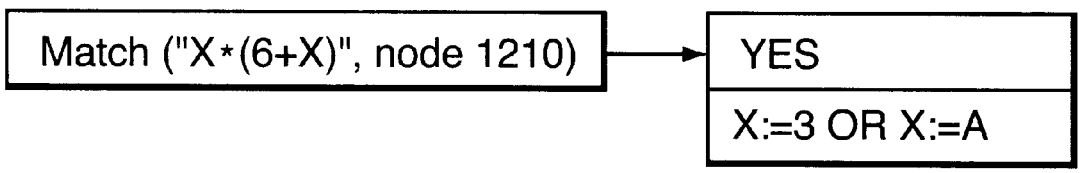

The match function is invoked by issuing a Match command: Match (Pattern, E-node). This causes a test to be performed to determine whether the specified E-node is an instance of the pattern while taking account of the equalities in the E-graph. Thus, if one considers the E-graph shown in FIG. 12, representing the expression A*(6+3) under the equality A=3, an invocation of the Match function using the pattern X*(6+X) causes the Match function to return the answer "yes" when applied to the E-node 1210. The Match function additionally returns the substitutions X:=3 or X:=A. This is illustrated in the bottom half of FIG. 12. It should be noted that there may sometimes be more than one match for the same node.

It should be emphasized that an E-graph is not unique and hence operators that are commutative or repetitive or distributive can thus cause problems in the matching process, since the current technique is not easily able to identify the terms as being identical under a commutative operation etc. A partial source program can be represented in a number of different E-graphs, for example, operators that are commutative or repetitive or distributive can thus cause problems. It should also be noted that the task of matching a pattern against an E-node is not equivalent to an exhaustive search of the entire E-graph. It should also be noted that multiple patterns may sometimes overlap in the E-graph.

Figure 13:
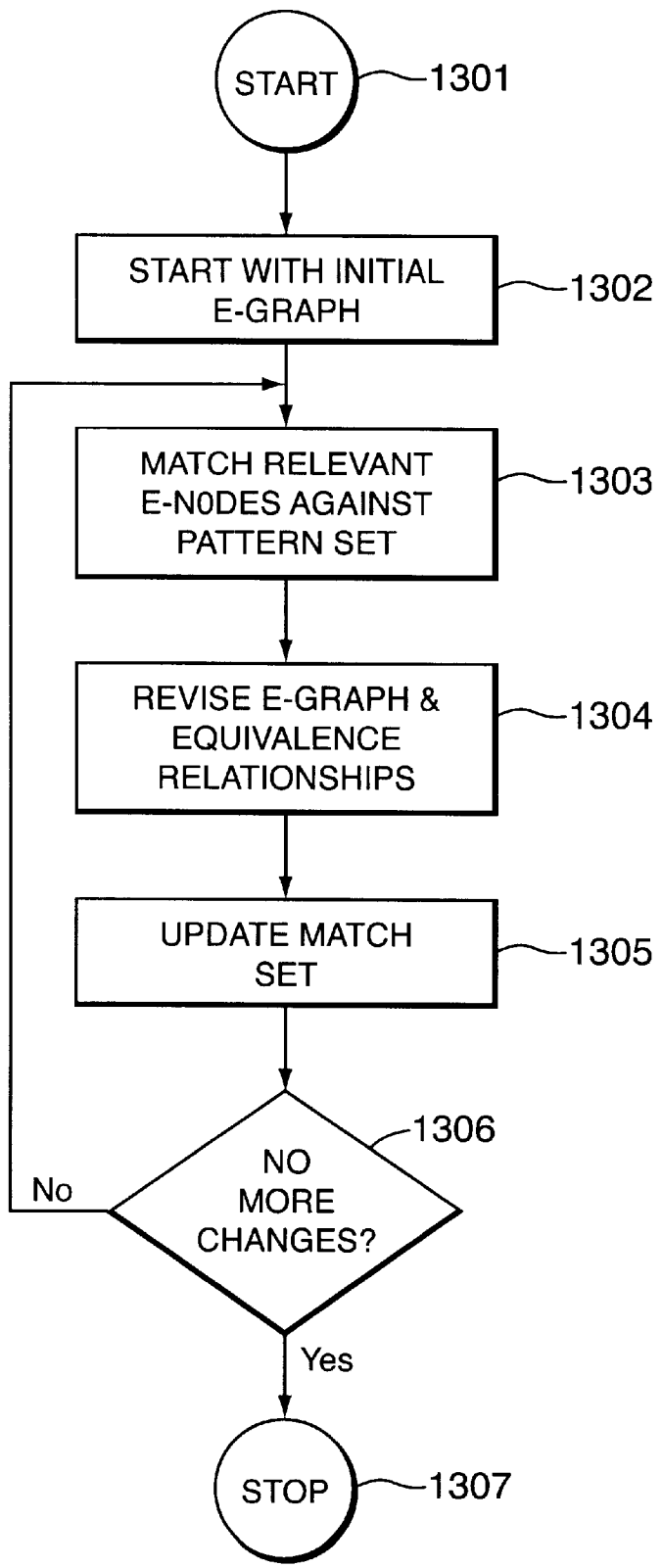
FIG. 13 is an overview of the pattern optimization technique of the present invention.

FIG. 13 shows the pattern-matching optimization process that is at the core of the prover of the present invention. The process starts at 1301 with an initial E-graph generated by the formula handler, as shown at 1302. The nodes of this E-graph are initially all deemed relevant, and are matched against the pattern set that is supplied by the axiom database. This is shown at 1303. Based upon the matches found, the E-graph is revised at 1304 and new equivalence relationships are generated. The new equivalence relationships are used to update the appropriate equivalence classes.

The set of matches is updated at 1305. If there are any more changes to be made to the E-graph due to unexplored match possibilities, then the process is iteratively repeated at 1303, as indicated by the decision step 1306. If there are no further relevant E-nodes to be matched against the pattern set, then the process ends as shown at 1307. The key goal is to avoid exploring match possibilities that are likely to yield irrelevant results.

Figure 14:
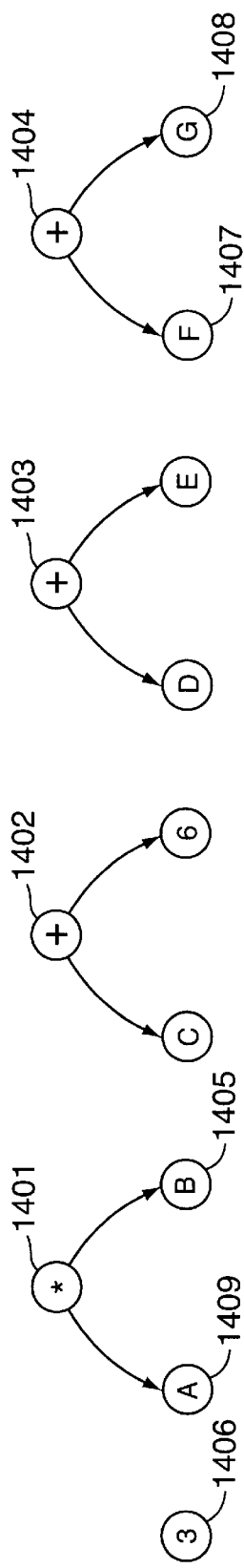
FIG. 14 shows Round 1 in an exemplary illustration of the pattern matching technique of the present invention.

The distinction between "relevant" and "irrelevant" matches can be best understood by considering an illustrative example. Consider the pattern X*(Y+Z) in the context of the E-graph shown in FIG. 14. As can be seen, this E-graph comprises five disconnected subgraph components representing the expressions "3", "A*B", "C+6", "D+E" and "F+G". In Round 1 of the pattern matching technique of the present invention, an attempt to match the pattern X*(Y+Z) against each of the E-nodes in FIG. 14 fails to reveal any matches.

Figure 15:
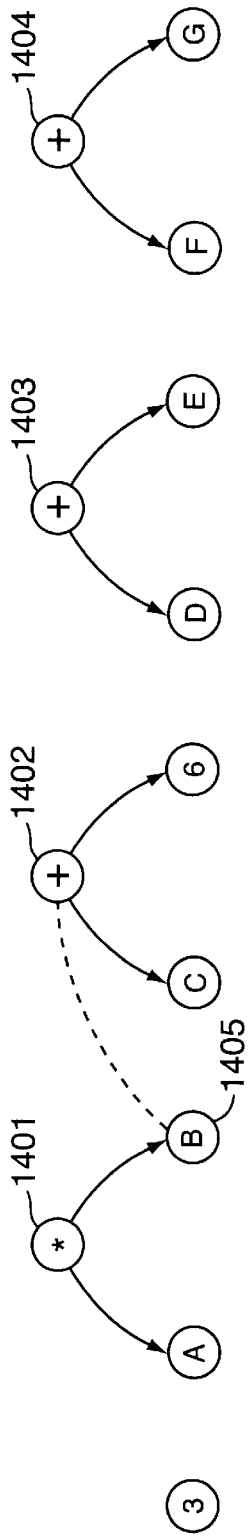
FIG. 15 shows Round 2 in the exemplary illustration of the pattern matching technique of the present invention.

In Round 2 of the pattern matching technique, which is shown in FIG. 15, an equivalence relationship is imposed between leaf node 1405 (representing the term "B") and interior node 1402 (representing the expression "C+6"). This immediately results in a match being found with the substitutions X:=A, Y:=C and Z:=6. For terminological convenience, we will refer to this match hereafter as Match 1.

Figure 16:
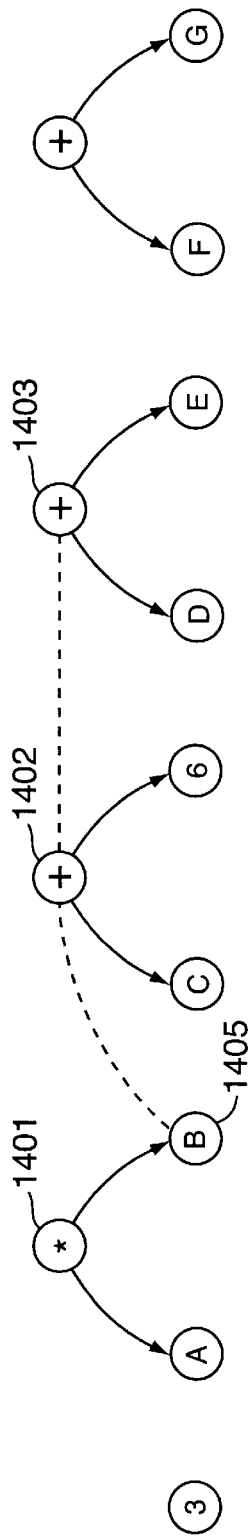
FIG. 16 shows Round 3 in the exemplary illustration of the pattern matching technique of the present invention.

In Round 3 of the pattern matching technique (shown in FIG. 16), an additional equivalence relationship is introduced between node 1402 (representing the expression "C+6") and node 1403 (representing the expression "D+E") When the pattern X*(Y+Z) is matched against this extended E-graph of FIG. 16, it results in an additional match being found with the substitutions X:=A, Y:=D and Z:=E. We will refer to the new match found in Round 3 as Match 2. This match is in addition to Match 1 discovered in Round 2, namely X:=A, Y:=C and Z:=6.

Figure 17:
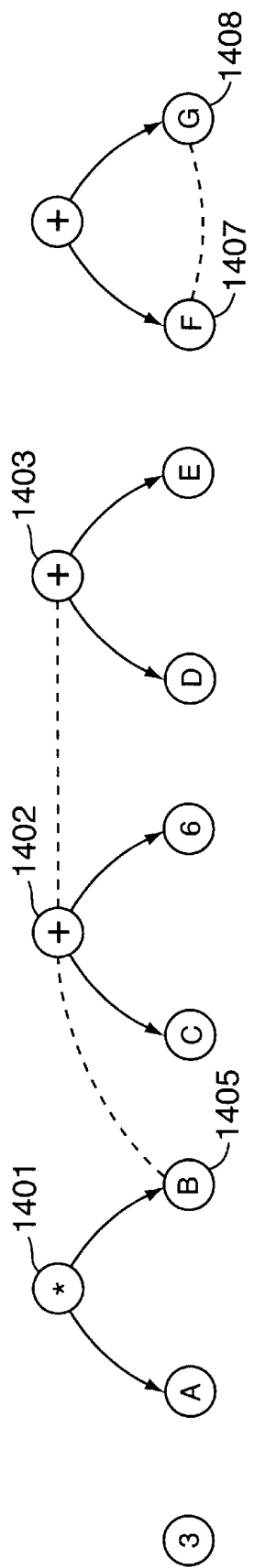
FIG. 17 shows Round 4 in the exemplary illustration of the pattern matching technique of the present invention.

FIG. 17 shows Round 4 of the illustrative pattern matching technique of the present invention wherein we introduce an equivalence relationship between nodes 1407 and 1408 (representing the terms "F" and "G" respectively). Invoking the match procedure at each of the E-nodes of the enhanced E-graph of FIG. 17 fails to find any new matches.

Figure 18:
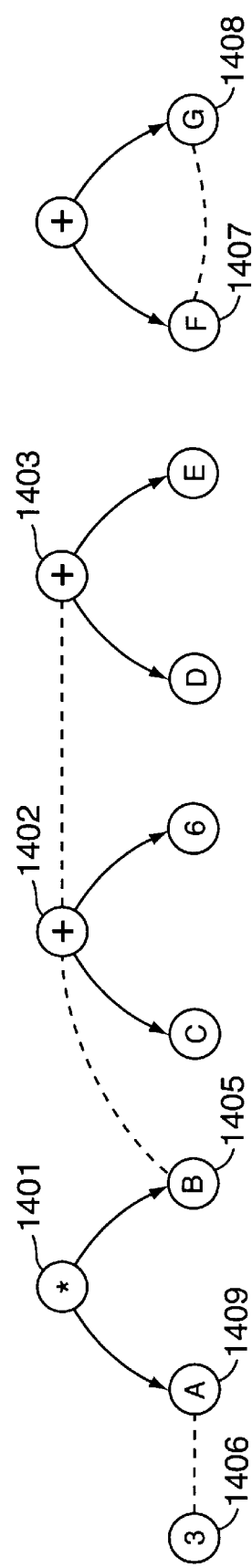
FIG. 18 shows Round 5 in the exemplary illustration of the pattern matching technique of the present invention.

In Round 5 of the illustrative pattern-matching technique of the present invention (shown in FIG. 18), we introduce a new equivalence relationship between nodes 1406 and 1409 (representing the terms "3" and "A" respectively). The nodes of the E-graph of FIG. 18 are once again matched against the pattern X*(Y+Z) in this fifth round. Round 5 appears to yield two additional matches, namely X:=3, Y:=C and Z:=6 (which we will refer to hereafter as Match 3), as well as X:=3, Y:=D and Z:=E (which we will refer to hereafter as Match 4).

It can be seen that the matches identified as Match 3 and Match 4 found in Round 5 of the pattern matching technique are not really new because the substitutions that they yielded for X (namely X:=3) belong to the same equivalence class as the substitutions found in the matches identified as Match 1 and Match 2 (namely X:=A).

This illustrates an important point about the pattern matching technique: that a match is irrelevant when the alternative substitutions for one of the variables in the search pattern (such as X:=3 and X:=A, for the example illustrated) already belong to the same equivalence class.

It should be emphasized that the matching process is used to trigger the creation of new arguments and the expression of new equivalences in the E-graph. Since we began with a collection of axioms containing variables as arguments, we first looked for patterns associated with each of the axioms. When a match occurs between a certain pattern and a specific E-node in the E-graph, it results in the detection of an instance of the axiom using the expressions that were used to create the pattern. That in turn may create new graph structure that did not exist in prior versions of the E-graph. We can thus make new inferences about which nodes are equal even if the expression has already been parsed because the structure of the E-graph gets enhanced from round to round.

Another nuance that must be reiterated is that we can have an E-graph when only a portion of the graph is "active" at any given moment. The computational effort involved in the pattern matching process can be reduced by searching for matches only within the active portion of the graph, even though one may have already parsed one or more formulae and produced the entire graph. Of course, it is possible that over time one may activate more and more of the graph, thus creating changes that may result in truly new matches being found.

It should be noted that the E-graphs that can be matched against the various patterns using the system and method of the present invention need not be fully connected and, in fact, some E-graphs that can be analyzed using this procedure may be composed of two or more free-standing subgraphs. This comes about because we use these E-graphs as a portion of the representation of a logical formula, and not every operator in the formula is represented by a corresponding node in the E-graph.

In particular, the logical AND and OR operators (and applications of certain other operators) may not have representations in an E-graph. Thus, for example, if we were trying to prove the formula "X>6 OR Y>5", then there may be no connection between the X and the Y elements in the corresponding E-graphs representing the formulae if there are no E-nodes to represent the OR operator in such a data structure.

Matching Optimizations

The prover 204 spends a considerable fraction of its time matching patterns in the E-graph. The general nature of this matching process has been described above. In the section that follows, we describe two important optimizations that speed up matching: a mod-time optimization and the pair-set (or pattern-element) optimization. Prior to a detailed consideration of these two optimization techniques, it would be useful to provide an overview of these two techniques and to identify certain unique situations needing specialized attention.

Assume that an initial round of matching (which involves searching the E-graph for occurrences of certain patterns) has been completed. As detailed earlier, the operation of the prover of the present invention results in the modification of the E-graph, followed by another round of matching. This patent discloses two distinct and independent optimization techniques for improving the efficiency of each subsequent round of matching without compromising its efficacy or accuracy.

The first of these optimization techniques (the mod-times optimization technique) involves restricting the search to only a portion of the E-graph, namely that portion of the E-graph in which new instances of patterns being searched may plausibly be found. New instances (or new matches) are instances of a specific search pattern that have not already been found in earlier rounds of matching.

The second of these optimization techniques (the pattern-element optimization technique) involves restricting the search to only a subset of the plenary set of patterns, namely to only those patterns of which new instances might have plausibly been created since the preceding rounds of matching. It should be reiterated that these two optimization techniques can be applied either separately or in conjunction with each other since neither depends on the other.

In the preferred embodiment of the present invention, the first optimization—recognizing a selected portion of the E-graph as being relevant to the search—is realized by identifying certain portions of the E-graph as having been "recently modified" following the mergers of equivalence classes, the activations of previously-inactive nodes or the creation of new active nodes.

The recently-modified portion of the E-graph can be identified by maintaining and updating the modification-time fields of each E-node. When the E-graph is modified or augmented, the "recently modified" parts of the E-graph can then be identified by comparing the modification-time fields of each E-node against a global modification time counter that is reset at the start of each initial round of matching.

Other implementations of this mod-times optimization technique are also possible. As can be seen, the global modification time counter is used as a baseline to track the relative times of the most recent modifications of each E-node. Hence, the mod-time counter can be effectively replaced with a sequence counter. For example, in response to each modification of the E-graph, we could set a "recently-modified" bit in the appropriate subset of the E-nodes. After performing a round of matching in which we searched over only those E-nodes whose "recently-modified" bits have been set, we would then clear the bits preparatory to the next round of matching.

In the preferred embodiment of the present invention, the second optimization—recognizing a selected subset of the patterns as being relevant to the search—is realized by associating a set of pattern-elements (namely parent-child pairs, parent-parent pairs, and trivial parent pairs) with each pattern, and then, as the E-graph is modified (through the mergers of equivalence classes, the activations of previously-inactive nodes, or the creation of new active nodes), using those associations to identify those pattern elements for which new instances might have been introduced by the modification of the E-graph prior to the start of the most recent round of matching.

Underlying the pattern-element optimization technique is the principle that there is no need to search for instances of a pattern P during a round of matching, unless some pattern element of P is among those pattern elements for which new instances could have plausibly been introduced since the previous round of matching. In the preferred embodiment of the present invention, the relevant pattern elements are tracked by updating the global parent-child (gpc), the global parent-parent (gpp), and global trivial-parent (gtp) sets in response to any modifications of the E-graph. Such an implementation also obviates the need to search for a pattern P unless some element of the pattern P is also an element of one of the three global sets.

It is clear that neither of the mod-times optimization or the pattern-element optimization techniques is applicable whenever a new pattern is introduced into the plenary set of search patterns after the initial round of matching has been completed. Since this new search pattern may be matched by features of the (current or prior versions of the) E-graph that may have already been in existence for some time, a special approach is needed for such newly-introduced search patterns. Hence, in one embodiment of the present invention, we keep track of such newly-introduced patterns and search for them over the entire E-graph without regard to what portions of the E-graph have recently been updated or what pattern elements have recently been affected by recent modifications to the E-graph.

Similar special treatment may also be needed when patterns under consideration include one or more of the so-called "multi-patterns". For the purposes of this discussion, a multi-pattern consists of a plurality of terms (called "pattern terms") e.g., f(g(x)),h(x) where an instance (or match) of the multi-pattern on the E-graph is said to occur when the E-graph contains an instance of each of its component terms (e.g., of both f(g(x)) and h (x)) subject to the constraint that all occurrences of any given variable (e.g., x) in those terms are matched to nodes belonging to the same equivalence class.

When searching for instances of multi-patterns, the prover of the present invention uses a third optimization that combines certain aspects of the mod-times optimization and the pattern-element optimization techniques in a non-trivial way. In particular, each pattern element of a multi-pattern is first associated with one or more of the constituent terms of the multi-pattern. These associations are then used (in conjunction with information contained in the three global sets regarding the presence or absence of the various pattern elements) to select a limited subset of the pattern terms for use as "gating-terms." The gating terms are matched against the recently-modified portion of the E-graph as the initial step in the process of matching a multi-pattern against the current E-graph.

Another special situation that sometimes arises occurs during the application of the case-splitting proving technique detailed elsewhere in the present patent. In more general terms, the prover may sometimes perform a series of modifications on an E-graph and then seek to reverse or undo those modifications, in order to restore the E-graph to an earlier state, from which the prover may then proceed forward with a different sequence of modifications. As a matter of terminology, the sequence of modifications and searches of an E-graph that have occurred up to that point, excluding those modifications and searches that were made on an E-graph that was subsequently restored to an earlier state, are referred to herein as having occurred on the "same path."

In cases where the E-graph is first modified and subsequently restored to an earlier state, the optimization techniques and special situations detailed above have to be adapted to only those searches and modifications that belong to the same path. Thus the effects of preceding rounds of matching and modifications to the E-graph that do not belong to the same path as the current context need to be ignored for purposes of the analysis. Thus, the optimized pattern-matching process of the present invention needs to search for the specific set of search patterns over the specific portion of the E-graph that reflects the modifications made to the E-graph that occurred on the same path as the present context (i.e. those changes to the E-graph that took place since the last round of matching, if any, on the same path as the current context).

The Mod-Time Optimization

In general terms, a round of matching performs the following computation:

```
S :={ }
for each matching rule with pattern P and body B do
    for each active E-node V do
        for each substitution θ such that θ(P) is equivalent to V do
            insert θ(B) into S
        end
    end
end
for each formula F in S do
    Assert (F)
end
```

In the pseudo code fragment shown above, the body B of a matching rule represents an axiom. The prover searches for and detects possibly useful or relevant instances of the body B by matching instances of the associated pattern P in the E-graph. Thus matching is performed for each active E-node in the E-graph using the plenary axiom set. As the prover discovers possibly useful or relevant instances of rule bodies, it adds them to a set S (initially empty). At the end of the matching round, the prover asserts all the formulas that it has accumulated in S.

The reason for accumulating a set of possibly useful or relevant instances of rule bodies instead of asserting each such instance as it is discovered is that asserting a formula may involve adding nodes to the E-graph and/or merging equivalence classes in the E-graph. Both the implementation and the specification of the search for rule pattern instances in the E-graph would be made more complicated if the E-graph could change during the search.

Consider two rounds of matching on the same path in a search tree. It has been found in such cases that for many pairs (P,V) no assertions performed between the two rounds changes the E-graph in a way that affects the set of instances of P that are equivalent to V. Consequently, the set of substitutions deduced in the first round of matching are identical to those deduced in the second round. In such cases, the computational work performed in the second round for the pair (P,V) is wasted since the instances that are found and asserted in the second round have already been found and asserted in the earlier round.

The mod-time optimization technique offers one way to avoid this duplicative computational work. The basic idea behind this technique is to introduce a global counter gmt that records the number of rounds of matching that have occurred on the current path in the search tree. This counter is incremented after each round of matching, and saved and restored by using the Context.Push and Context.Pop operations. The Context.Push operation is used to save the state of the current context (including the associated E-graph) on a stack. The corresponding Context.Pop operation restores the context (including the associated E-graph) to the state saved earlier by the Context.Push operation.

We also introduce a field E.mt for each active E-node E, which records the value of gmt the last time any descendent of E was involved in a merger of equivalence classes. The strategy behind the technique is to maintain the "mod-time invariant," which can be expressed in pseudocode as:

for all matching rules mr with pattern P and body B,
    for all substitutions θ such that θ(P) is represented in the E-graph,
        either θ(B) has already been asserted, or
        the E-node V that represents θ(P) satisfies V.mt=gmt Given the mod-time invariant a general version of a matching round becomes:

```
S := { }
for each matching rule with pattern P and body B do
    for each active E-node V such that V.mt=gmt do
        for each substitution θ such that θ(P) is equivalent to V do
            insert θ(B) into S
        end
    end
end;
gmt := gmt + 1;
for each formula F in S do
    Assert (F)
end
```

The reason that one can ignore those E-nodes V for which V.mt≠gmt is that the invariant implies that such an E-node matches a pattern only if the corresponding instance of the rule's body has already been found. The reason that incrementing the gmt counter by the step gmt:=gmt+1 maintains the invariant is that at the end of a matching round, all instances of matches to a rule have been found.

The other place where we have to be careful about maintaining the invariant is when two or more E-nodes are merged (i.e., made equivalent). Thus, when two E-nodes V and W are merged, we need to enumerate all E-nodes U whose equivalence classes are affected by the merger because the merger might change the set of terms congruent to U in the E-graph. We do this by calling procedure UpdateMT (V) (or, equivalently, procedure UpdateMT(W)) immediately after the merger. The procedure UpdateMT(V) can be defined as follows:

procedure UpdateMT(V)≡for each P such that P is a parent of some E-node equivalent to V do
    if P.mt<gmt then
        P.mt:=gmt;
        UpdateMT(P)
    end
end In the case of circular E-graphs, the recursion is terminated because the second time an E-node is visited, its mod-time will already have been updated. All of these updates to the mt fields of each of the E-nodes may be undone by invoking the Context.Pop operation.

In addition to the basic time-stamping technique underlying the mod-time optimization, it would be useful to consider three special cases. The first of these three special cases involves rules that are associated with multiple patterns. As explained below, this poses an awkward problem. Consider the case of a multi-pattern rule with multiple patterns $p_i, \ldots, p_n$, and suppose further that one or more mergers change the E-graph so that there is at least one new instance θ of the multi-pattern. That is, even if most θ($p_i$) were represented in the old E-graph, there is at least one i, r which the term θ($p_i$) is not represented in the old E-graph. Under such conditions, for at least some i, the E-node representing θ($p_i$) has its mod-time equal to gmt, but this need not hold for all i.

Hence, when the matcher searches for an instance of a multi-pattern by extending all matches of $p_i$ in ways that match the other p's, the matcher cannot confine its search only to new matches of $p_i$. Therefore, the matcher considers each multi-pattern $P_1, \ldots P_n$ times, using each pattern term $p_i$ in turn as a "gating term". The gating term is matched first, against all E-nodes whose mod-times are equal to gmt, and any matches found are extended to cover the other pattern terms in all possible ways. In searching for extensions, the mod-times are ignored.

Second, it is possible for matching rules to be created dynamically during the course of a proof. If we tried to maintain the mod-time invariant as stated above when a new rule was created, we would have to match the new rule immediately or reset the mt fields of all active E-nodes, neither of which is an attractive option. Therefore, we maintain a boolean property of matching rules called newness, and weaken the mod-time invariant by limiting its outer quantification to apply to all non-new matching rules, instead of to all matching rules.

Third, as mentioned earlier, the matcher restricts its search to the "active" portion of the E-graph. We therefore must set V.mt:=gmt whenever an E-node V is activated, so that the matcher does not miss newly activated instances of the pattern. Combining these three nuances, a detailed version of the mod-time heuristic (the "mod-time invariant") can be restated as follows:

for all matching rules mr with pattern $P_1, \ldots P_n$, and body B either mr.new or
    for all substitutions θ such that each θ($P_i$) is represented by an active E-node in the E-graph
        either θ(B) has already been asserted, or
        there exists an i such that the E-node V that represents θ($P_i$) satisfies V.mt=gmt The pseudo code for a round of matching that makes use of this refined formulation of the "mod-time" invariant is:

```
S := { }
for each matching rule mr do
if mr.new then
    for each θ such that for each p in mr.pattern, θ(p) exists and is active do
        insert θ(mr.body) into S
    end;
    mr.new := false
else
    for each p in mr.pattern do
        for each active E-node V such that V.mt = gmt do
            for each φ such that φ(p) is equivalent to V do
                for each extension θ of φ such that
```

```
                    for each q in mr.pattern, θ(q) exists and is active do
                        insert θ(mr.body) into S
                    end
                  end
                end
              end
            end
          end;
          gmt := gmt + 1;
          for each formula F and S do
              Assert (F)
          end
```

To maintain the mod-time invariant, we call the UpdateMT (V) procedure immediately after an equivalence class V has been enlarged by a merger, and we set V.mt:=gmt every time an E-node V is activated, and we set mr.new:= TRUE every time a matching rule mr is created. Although not reflected in the refined pseudo-code, the upward recursion in updateMT can be set to ignore inactive E-nodes.

For any function symbol f, the E-graph data structure maintains a linked list of all E-nodes that represent applications of f. The matcher traverses this list when attempting to match a pattern term that is an application of f. When we utilize the mod-time optimization technique, only those list elements with mod times equal to gmt are of interest. A significant time improvement is obtained by keeping this list sorted in order of decreasing mod-times. This is easily done by moving an E-node to the front of its list when its mod-time is updated, and by undoing this in the Context. Pop operation.

The Pattern Element (Pair-Set) Optimizations

Consider two rounds of matching that happen on the same path in a search tree. In such cases, for many patterns $P_1$, no assertions performed between the two rounds changes the E-graph in a way that affects the set of instances of P that are present in the E-graph. In such cases, the work performed in the second round for the pattern P is not productive, since any instances of the pattern that are found in the second round have already been found in preceding rounds.

The pattern element optimization (also known as the pair set) is a technique for avoiding such unproductive pattern-searching. The basic idea behind this technique is to detect situations when a modification to the E-graph is not "relevant" to a search for a pattern, in that the modification is unable to create any new instances of the pattern in the E-graph. A round of matching thus need consider only such patterns as are relevant to at least one of the modifications to the E-graph that have taken place since the last round of matching on the current search path.

There are two kinds of modifications to an E-graph that need to be considered: mergers of equivalence classes and activations of E-nodes. We will begin by considering the mergers of two or more equivalence classes. There are two ways in which a merger can be relevant to a search for a pattern in an E-graph. To explain these two cases, it would be useful to start with a couple of definitions.

A pair of function symbols (f,g) is called a parent-child element of a pattern P when the pattern P contains a term of the form:

f( . . . , g( . . . ), . . . )

i.e., an application of g occurs as an argument of f somewhere in the pattern.

A pair of function symbols (f,g), that need not necessarily be distinct, is called a parent-parent element of a pattern P for the pattern variable x if the pattern P contains two distinct occurrences of the pattern variable x, one of which is in a term f of the form:

f( . . . , x, . . . ), and the other of which is in a term g of the form:

g( . . . , x, . . . ), i.e., somewhere in the pattern, f and g are applied to distinct occurrences of the same pattern variable x. For example, (f,f) is a parent-parent element for x for the pattern f(x,x), but not a parent-parent element of the pattern f(x).

The first case in which a merger of two or more equivalence classes is relevant to a search for a new pattern is "parent-child" relevance, in which, for some parent-child element (f,g) of the pattern, the merger makes some active application of g equivalent to some active argument of f.

The second case in which a merger of two or more equivalence classes is relevant to a search for a new pattern is called "parent-parent" relevance, in which for some parent-parent element (f,g) of the pattern, the merger makes some active argument of f equivalent to some active argument of g.

Mergers cannot introduce into an E-graph any new instances of a pattern P if the merger is not found relevant to a search for the pattern P under either of the parent-child or parent-parent relevance criteria.

This finding underlies the optimization technique. The basic idea behind the technique is to maintain two global variables: gpc and gpp, each of which is a set containing function symbol pairs. The invariant satisfied by each of these sets can be expressed in pseudocode as:

for any matching rule mr with pattern P and body B
    for any substitution θ such that θ(P) is represented in the E-graph
        θ(B) has already been asserted, or
        gpc contains some parent-child element of P, or
        gpp contains some parent-parent element of P To maintain this invariant, we add function symbol pairs to the gpc and/or to gpp sets whenever a merger is performed in the E-graph (and correspondingly, undo these additions when such mergers are undone). To take advantage of the invariant, a round of matching using this scheme simply ignores a matching rule if the corresponding pattern elements of the rule have no overlap with the gpc or gpp sets. After a plenary round of matching, the gpc and gpp sets are reinitialized.

In addition to mergers, an E-graph also changes when one or more E-nodes are activated. The rules for maintaining the gpc and gpp sets when one or more E-nodes are activated are set forth below. When activating an E-node V labeled f, the prover 204:

(1) adds a pair (f,g) to the gpc for each active argument of V that is also an application of g;
(2) adds a pair (g,f) to the gpc for each active E-node labeled g that has V as one of its arguments; and
(3) adds a pair (f,g) to the gpp for each E-node g that labels an active E-node having any arguments in common with the arguments of V.

Activation introduces additional complexity because activating an E-node can create a new instance of a pattern, even though it does not result in the addition of any of the pattern's parent-parent or parent-child elements to either the gpp or the gpc sets. This can happen in the rather trivial case that a pattern P is of the form $f(X_1, \ldots, X_n)$ where each of the x's are distinct pattern variables, and the activated E-node is an application of f. In case of a multi-pattern, any pattern term of this form can suffice, when the pattern variables that are arguments to f do not occur elsewhere in the pattern P. To address this problem, we define a third kind of pattern element called the trivial parent element, and introduce a third global set called gtp called the global trivial parent element set whose elements f can be defined as follows: A function symbol f is a trivial parent element of a pattern P if the pattern P consists of an application of f to distinct pattern variables, or if the pattern P is a multi-pattern one of whose terms is an application of f to distinct pattern variables that do not occur elsewhere in the multi-pattern.

Consequently, we create the global set gtp and add a fourth alternative to the disjunction in the invariant set forth earlier:

for any matching rule mr with pattern P and body B
  for any substitution θ such that θ(P) is represented in the E-graph
    θ(B) has already been asserted, or
    gpc contains some parent-child element of P, or
    gpp contains some parent-parent element of P, or
    gtp contains some trivial parent element of P To incorporate these extensions to the basic pair-set optimization scheme certain additional changes need to be made to the basic implementation. For example, we add f to the gtp set when activating an application of f. Further, we reinitialize gtp after every round of matching. In addition, a round of matching does not skip a rule if the pattern corresponding to the rule has a trivial parent element in common with the gtp set.

Mod-Times & Pattern Elements With Multi-Patterns: In addition to the above optimization techniques, there is one more optimization that makes use of pattern elements and mod-times. It should be recalled that when matching a multi-pattern, each term in the multi-pattern is treated as a gating term that is matched only against E-nodes having the current mod-time. Further, each match of the gating term is extended to match the other terms in the multi-pattern, without regard to their respective mod-times.

Considering each term in the multi-pattern as a gating term is computationally expensive. Consequently, in a further embodiment of the present invention, the information in the global pattern element sets is used to reduce the number of gating terms that need to be considered when matching a multi-pattern.

As a simple example, consider the multi-pattern f (g(x) ), h (x)

An E-graph contains an instance of this multi-pattern if and only if there exist nodes U, V, and W in the E-graph such that five conditions are satisfied simultaneously:

1. f(U) is active;
2. g(V) is active;
3. h(W) is active;
4. U is equivalent to g(V); and
5. V is equivalent to W.

Now assume that at the moment this multi-pattern is considered for matching, the gpc set contains only the function element pair {(f,g)} while the gpp set is empty. For any new instance (U,V,W) of the multi-pattern, it is axiomatic that one of the five constraints must have become true last. Constraint 3 or Constraint 5 could not have become true last, since any modification to the E-graph that made Constraints 3 or 5 the last of the five constraints to become true would have also introduced (g,h) into the gpp set.

Consequently, for each new instance of the multi-pattern, the modification to the E-graph that made it become an instance of the multi-pattern (hereinafter referred to as the enabling modification) must have made Constraints 1, 2 or 4 to be the last of the five constraints to become true.

However, any modification to the E-graph that caused Constraints 1, 2 or 4 to be the last of the five constraints to become true would have also updated the mod-time of the node f(U). Consequently, in such situations, it suffices to use f(g(x)) alone rather than both f(g(x)) and h(x) as gating terms.

As a second example, consider the same multi-pattern, f(g(x)),h(x) and suppose that when this multi-pattern is considered for matching, the gpc and the gtp sets are both empty while the gpp set contains only the {(g,h)} function element pair. In this case, the last of the five constraints to be satisfied for any new instance (U, V, W) of the multi-pattern could not have been Constraints 1, 2 or 4, since this would have added the function element pair (f,g) to the gpc set.

At the same time, the enabling modification could not have satisfied Constraint 3 last because this would have added the trivial function element h to the gtp set. Consequently, the enabling modification must have satisfied Constraint 5 last, and thus must have updated the mod-time of both f(U) and g(V). Hence, in such situations, we can use either f(g(x)) or h(x) as the gating term and there is no need to use both of them as gating terms.

As a third example, once again consider the same multi-pattern f(g(x)),h(x) and suppose further that when the multi-pattern is considered for matching, the gpc set contains only the function element pair {(f,g)}, the gpp set contains the function element pair {(g,h)} while the gtp set is empty. In this case, the enabling modification must either have satisfied Constraint 4 last, updating the mod-time of f (U), or have satisfied Constraint 5 last, updating the mod-times of both f (U) and h (W). Consequently, in such situations only f(g(x)) suffices as the gating term; it would not suffice to use h(x) as the gating term.

It has been found that these observations can be generalized as detailed below. When matching a multi-pattern with pattern terms $P_1, \ldots, p_n$, it suffices to choose a set of gating terms that satisfy the following conjunctive conditions:

(1) Each $p_i$ is included as a gating term if it contains any parent-child pair in the gpc set;

(2) For each g, h and $x_i$ such that (g,h) is in the gpp set and the pattern contains (g,h) as a parent-parent pair for $x_i$, the set of gating terms includes some term $p_j$ that contains the pattern variable $x_i$; and (3) Each $P_i$ is included as a gating term if it has the form $f(v_1, \ldots, v_k)$ where the v's are pattern variables, f is in the gtp set, and for each $v_j$, the pattern has either no parent-parent pairs for $V_j$ or some parent-parent pair for $v_j$ is also in the gpp set.

To construct a set of gating terms, the prover 204 begins with the minimum set that satisfies conditions (1) and (3) above, and then expands the set of gating terms as necessary for each g, h and $x_i$ satisfying condition (2). The final result depends on the order in which the different instances of condition (2) are considered, and may not always be of the minimum size. However, in practice, this approach sufficiently reduces the number of gating terms to compensate for the additional computational complexity.

Implementation of the Pattern Element Optimization Technique

As can be appreciated, the pattern elements optimization techniques need to be implemented carefully if they are to yield more benefits than their computational cost. Since exact set operations are computationally expensive, the preferred embodiment of the present invention uses approximate sets, which behave like real sets except in that membership and overlap tests on such approximate sets occasionally return false positives.

Let us first consider sets of function symbol elements (like the gtp set). We fix a hash function hash whose domain is the set of function symbols and whose range is [1 . . . 64] (for an implementation on a sixty-four bit machine). The idea is that the true set S of function symbols is approximated by a word that has bit hash (s) set for each s∈S, while all other bits are set to zero. To test if a symbol u is a member of the set, we check if bit hash(u) is set in the word. Likewise, to test if two sets overlap, we test to see if the bitwise AND of the corresponding bit vectors is non-zero.

Next we consider sets of pairs of function symbols (like the gpc and the gpp sets). For such sets, we use a one-dimensional array of sixty-four 64-bit words: for each function symbol pair (f,g) in the set, we set bit hash(g) of word hash(f). When adding an unordered pair (f,g) to the gpp set, we add either (f,g) or (g,f) to the array representation, but not necessarily both. At the beginning of a round of matching, when the gpp set is about to be read rather than written to, we replace the set with its symmetric closure (i.e., the union of the set with its transpose).

For sparse approximate pair sets, like the set of parent-parent elements or parent-child elements of a particular matching rule, we eliminate the empty rows in the array, but this is not done for the gpp and the gpc sets.

To each equivalence class Q in the E-graph, we associate two approximate sets of function symbols: lbls (Q) and plbls(Q), where lbls(Q) is the set of labels of active nodes in Q and plbls(Q) is the set of labels of active parents of nodes in Q. The pseudocode for merging two equivalence classes, say Q into R, can be restated as follows:

gpc :=gpc union plbls(Q) X lbls(R) union lbls(Q) X plbls(R)

gpp :=gpp union plbls(Q) X plbls(R)

lbls(R) :=lbls(R) union lbls(Q)

plbls(R) :=plbls(R) union plbls(Q)

for each child ch of R do plbls(ch):=plbls(ch) union lbls(Q)
end;

for each child ch of Q do plbls(ch):=plbls(ch) union lbls(R)
end;

Each of these operations must be capable of being undone by the Context.Pop operation. Needless to say, it is necessary to maintain plbls, plbls, gpc, gpp, and gtp every time a node is activated, and the requisite implementation details would be available or obvious to one of ordinary skill in the art.

In addition to function symbols and pattern variables, a pattern can also contain E-nodes as a representation for a specific ground term. Such E-nodes are called pattern-relevant E-nodes. For example, consider the following formula:

(Ax:P(f (x))→(Ay:g(y,x)=0))

By default the outer quantification will have the trigger f(x). When this is matched, let V be the E-node that matches x. Then a corresponding matching rule will be created and asserted to represent the inner quantification. This rule will have the trigger g(y,V), which contains the pattern variable y, the function symbol g, and the constant pattern-relevant E-node V.

For the purpose of computing the gpc set, which is the set of parent-child pairs of a pattern, we treat each pattern-relevant E-node as though it were a nullary function symbol. For example, after the matching rule corresponding to the inner quantification is asserted, a merger of an argument of g with an equivalence class containing V would add the parent-child pair (g,V) to the gpc set. Pattern-relevant E-nodes also come up without nested quantifiers if a pattern contains ground terms (i.e., terms with no occurrences of a pattern variable), such as NIL or Succ(0).

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A computer-implemented method for verifying the conformity of information with one or more rules, said method comprising the steps of:

transforming the information into one or more formulae testable against one or more of the rules;

generating an initial graph from each of said formulae, each said graph including a directed acyclic graph connecting a plurality of nodes;

converting each of said one or more rules into one or more distinct search patterns;

searching each node of each said initial graph for instances of said distinct search pattern and storing each identified instance; and repeating the following steps to thereby perform proving of the information as long as new instances of said one or more distinct search patterns are detected:

selectively modifying said graph;

identifying one or more regions of sad selectively modified graph as being relevant to a search for said one or more distinct search patterns; and searching the nodes only in said identified relevant regions of said selectively modified graph for instances of said one or more distinct search patterns.

2. The computer-implemented method of claim 1 wherein a set of externally-generated rules about the syntax and semantics of the program or symbolic logic is created and modified dynamically.

3. The computer-implemented method of claim 1 for verifying the conformity of information with one or more rules, wherein the step of selectively modifying said graph is performed by adding new nodes to said graph.

4. The computer-implemented method of claim 1 for verifying the conformity of information with one or more rules, wherein the step of selectively modifying said graph is performed by activating previously inactive nodes in said graph.

5. The computer-implemented method of claim 1 for verifying the conformity of information with one or more rules, wherein the step of selectively modifying said graph is performed by adding equivalence relationships to selected nodes of said graph.

6. The computer-implemented method of claim 1 wherein said step of identifying one or more regions of said selectively modified graph as being relevant to a search for a distinct search pattern is performed by maintaining information about the time at which each of the nodes in the active portion of said graph was last modified or affected.

7. The computer-implemented method of claim 6 wherein said information about the time at which each of the nodes in the active portion of said graph was last modified or affected is maintained by incorporating a status bit in a data structure associated with the nodes of the graph, said status bit being set when the associated node is modified during a round of matching and set status bit being cleared at the start of each round of matching.

8. The computer-implemented method of claim 6 in which at least one rule has been converted into multiple distinct search patterns (a "multi-pattern"), wherein information about the times at which each of the nodes in the active portion of said graph was last modified or affected is gated using the earliest modification time for all of the patterns of said multi-pattern.

9. A computer-implemented method for verifying the conformity of information with one or more rules, said method comprising the steps of:

transforming the information into one or more formulae testable against one or more of the rules;

generating an initial graph from each of said formulae, each said graph including a directed acyclic graph connecting a plurality of nodes;

converting each of said one or more rules into one or more distinct search patterns;

searching each node of each said initial graph for instances of said distinct search pattern and storing each identified instance; and repeating the following steps to thereby perform proving of the information as long as new instances of said one or more distinct search patterns are detected:
    selectively modifying said graph;
    identifying one or more search patterns as being relevant to the search for new matches being conducted in regions of said selectively modified graph; and
    searching said selectively modified graph only for instances of said identified one or more relevant search patterns.

10. The computer-implemented method of claim 9 wherein a set of externally-generated rules about the syntax and semantics of the program or symbolic logic is created and modified dynamically.

11. The computer-implemented method of claim 9 for verifying the conformity of information with one or more rules, wherein the step of selectively modifying said graph is performed by adding new nodes to said graph.

12. The computer-implemented method of claim 9 for verifying the conformity of information with one or more rules, wherein the step of selectively modifying said graph is performed by activating previously inactive nodes to said graph.

13. The computer-implemented method of claim 9 for verifying the conformity of information with one or more rules, wherein the step of selectively modifying said graph is performed by adding equivalence relationships to selected nodes of said graph.

14. The computer-implemented method of claim 9 wherein said step of identifying one or more search patterns as being relevant to the search for new matches being conducted in regions of said selectively modified graph is responsive to a merger of two or more equivalence classes.

15. The computer-implemented method of claim 14 wherein said step of identifying one or more regions of said selectively modified graph as being relevant to a search for a distinct search pattern responsive to a merger of two or more equivalence classes further comprises the following steps:

determining a pair of function symbols, occurring in said distinct search pattern to he a parent-child pair, said parent-child pair of function symbols further comprising a parent function symbol and a child function symbol, said parent-child pair of function symbols being characterized by an application of said child function symbol also occurring as an argument of said parent function symbol in said distinct search pattern; and detecting when said merger of two or more equivalence classes results in some active application of said child function symbol becoming equivalent to some active argument of said parent function symbol.

16. The computer-implemented method of claim 15 wherein said step of determining a pair of function symbols occurring in said distinct search pattern to be a parent-child pair is performed by maintaining a global set of parent-child pairs occurring in the active portion of said graph.

17. The computer-implemented method of claim 16 wherein said global set of parent-child function pairs is realized using an approximate set.

18. The computer-implemented method of claim 17 wherein said approximate set is implemented using a hash function.

19. The computer-implemented method of claim 14 wherein said step of identifying one or more regions of said selectively modified graph as being relevant to a search for a distinct search pattern responsive to a merger of two or more equivalence classes further comprises the following steps:

determining a pair of function symbols, occurring in said distinct search pattern to be a parent-parent pair, said parent-parent pair of function symbols further comprising a first parent function symbol and a second parent function symbol, said parent-parent pair of function symbols being characterized by said first parent symbol and said second parent symbol being independently applied to two distinct occurrences of a common pattern variable in said distinct search pattern; and detecting when said merger of two or more equivalence classes results in some active argument of said first parent function symbol becoming equivalent to some active argument of said second parent function symbol.

20. The computer-implemented method of claim 19 wherein said step of determining a pair of function symbols occurring in said distinct search pattern to be a parent-parent pair is performed by maintaining a global set of parent-parent pairs occurring in the active portion of said graph.

21. The computer-implemented method of claim 20 wherein said global set of parent-parent function pairs is realized using an approximate set.

22. The computer-implemented method of claim 21 wherein said approximate set is implemented using a hash function.

23. The computer-implemented method of claim 9 wherein said step of identifying one or more search patterns as being relevant to the search for new matches being conducted in regions of said selectively modified graph is responsive to the activation of previously inactive nodes in said graph.

24. The computer-implemented method of claim 23 wherein said step of identifying one or more regions of said selectively modified graph as being relevant to a search for a distinct search pattern responsive to the activation of previously inactive nodes in said graph further comprises the following steps:

updating a global set of parent-child pairs occurring in the active portion of said graph responsive to the activation of previously inactive nodes in said graph to include all parent-child pairs in the newly activated nodes;

updating a global set of parent-parent pairs occurring in the active portion of said graph responsive to the activation of previously inactive nodes in said graph to include all parent-parent pairs in the newly activated nodes; and maintaining a global set of trivial parent elements occurring in the active portion of said graph and updating said global trivial parent set responsive to the activation of previously inactive nodes in said graph.

25. The computer-implemented method of claim 24 wherein said global set of trivial parent function elements is realized using an approximate set.

26. The computer-implemented method of claim 25 wherein said approximate set is implemented using a hash function.

27. The computer-implemented method of claim 9 wherein said step of identifying one or more search patterns as being relevant to the search for new matches being conducted in regions of said selectively modified graph is responsive to the activation of new nodes in said graph.

28. The computer-implemented method of claim 27 wherein said step of identifying one or more regions of said selectively modified graph as being relevant to a search for a distinct search pattern responsive to the activation of new nodes in said graph further comprises the following steps:

updating a global set of parent-child pairs occurring in the active portion of said graph responsive to the activation of new nodes in said graph to include all parent-child pairs in the newly activated nodes;

updating a global set of parent-parent pairs occurring in the active portion of said graph responsive to the activation of new nodes in said graph to include all parent-parent pairs in the newly activated nodes; and maintaining a global set of trivial parent elements occurring in the active portion of said graph and updating said global trivial parent set responsive to the activation of new nodes in said graph.

29. The computer-implemented method of claim 28 wherein said global set of trivial parent function elements is realized using an approximate set.

30. The computer-implemented method of claim 29 wherein said approximate set is implemented using a hash function.

31. A computer-implemented system for verifying the conformity of information with one or more rules, said system comprising:

a verification condition generator for transforming at least a part of the information into one or more formulae that are amenable to automated testing against one or more of the rules;

a formula manager for generating an initial respective graph from each of said one or more formulae, each said graph including a directed acyclic graph connecting a plurality of nodes;

a pattern generator for converting each of said one or more rules into one or more distinct search patterns;

a prover for searching each node of each said initial graph for instances of said one or more distinct search patterns and storing each identified instance; and iteration means to perform proving of the information as long as new instances of said one or more distinct search patterns are detected, including:

a graph modifier for selectively modifying said graph to add new nodes;

a relevance identifier for identifying one or more regions of said selectively modified graph as being relevant to a search for said one or more distinct search patterns; and a pattern matcher for searching nodes only in said identified one or more relevant regions of said selectively modified graph for instances of said one or more distinct search patterns.

32. The computer-implemented system of claim 31 wherein a set of externally-generated rules about the syntax and semantics of the program or symbolic logic is created and modified dynamically.

33. The computer-implemented system of claim 31 for verifying the conformity of information with one or more rules, wherein said graph modifier for selectively modifying said graph adds new nodes to said graph.

34. The computer-implemented system of claim 31 for verifying the conformity of information with one or more rules, wherein said graph modifier for selectively modifying said graph activates previously inactive nodes of said graph.

35. The computer-implemented system of claim 31 for verifying the conformity of information with one or more rules, wherein said graph modifier for selectively modifying said graph adds equivalence relationships to selected nodes of said graph.

36. The computer-implemented system of claim 31 wherein the identification of one or more regions of said selectively modified graph as being relevant to a search for a distinct search pattern is performed by maintaining a modification time table containing information about the time at which each of the nodes in the active portion of said graph was last modified or affected.

37. The computer-implemented system of claim 36 wherein said information about the time at which each of the nodes in the active portion of said graph was last modified or affected is maintained by incorporating a status bit in a data structure associated with the nodes of the graph, said status bit being set when the associated node is modified during a round of matching and set status bit being cleared at the start of each round of matching.

38. The computer-implemented system of claim 36 in which at least one rule has been converted into multiple distinct search patterns (a "multi-pattern"), wherein information about the times at which each of the nodes in the active portion of said graph was last modified or affected is gated using the earliest modification time for all of the patterns of said multi-pattern.

39. A computer-implemented system for verifying the conformity of information with one or more rules, said system comprising:

a verification condition generator for transforming at least a part of the information into one or more formulae that are amenable to automated testing against one or more of the rules;

a formula manager for generating an initial respective graph from each of said one or more formulae, each said graph including a directed acyclic graph connecting a plurality of nodes;

a pattern generator for converting each of said one or more rules into one or more distinct search patterns;

a prover for searching each node of each said initial graph for instances of said one or more distinct search patterns and storing each identified instance; and iteration means to perform proving of the information as long as new instances of said one or more distinct search patterns are detected, including:

a graph modifier for selectively modifying said graph;

a relevance identifier for identifying one or more search patterns as being relevant to the search for new matches being conducted in regions of said selectively modified graph; and a pattern matcher for searching said selectively modified graph only for instances of said identified one or more relevant search patterns.

40. The computer-implemented system of claim 39 wherein a set of externally-generated rules about the syntax and semantics of the program or symbolic logic is created and modified dynamically.

41. The computer-implemented system of claim 39 for verifying the conformity of information with one or more rules, wherein said graph modifier for selectively modifying said graph adds new nodes to said graph.

42. The computer-implemented system of claim 39 for verifying the conformity of information with one or more rules wherein said graph modifier for selectively modifying said graph activates previously inactive nodes of said graph.

43. The computer-implemented system of claim 39 for verifying the conformity of information with one or more rules, wherein said graph modifier for selectively modifying said graph adds equivalence relationships to selected nodes of said graph.

44. The computer-implemented system of claim 39 wherein said relevance identifier for identifying one or more search patterns as being relevant to the search for new matches being conducted in regions of said selectively modified graph is responsive to a merger of two or more equivalence classes.

45. The computer-implemented system of claim 44 wherein said relevance identifier for identifying one or more regions of said selectively modified graph as being relevant to a search for a distinct search pattern responsive to a merger of two or more equivalence classes further comprises the following:
   a comparator means for determining a pair of function symbols, occurring in said distinct search pattern to be a parent-child pair, said parent-parent pair of function symbols further comprising a parent function symbol and a child function symbol, said parent-child pair of function symbols being characterized by an application of said child function symbol also occurring as an argument of said parent function symbol in said distinct search pattern; and
   an equivalence detector for detecting when said merger of two or more equivalence classes results in some active application of said child function symbol becoming equivalent to some active argument of said parent function symbol.

46. The computer-implemented system of claim 45 wherein said comparator for determining a pair of function symbols occurring in said distinct search pattern to be a parent-child pair further comprises a database including a global set of parent-child pairs occurring in the active portion of said graph.

47. The computer-implemented system of claim 46 wherein said global set of parent-child function pairs is realized using an approximate set.

48. The computer-implemented system of claim 47 wherein said approximate set is implemented using a hash function.

49. The computer-implemented system of claim 44 wherein said relevance identifier for identifying one or more regions of said selectively modified graph as being relevant to a search for a distinct search pattern responsive to a merger of two or more equivalence classes further comprises the following:
   a comparator for determining a pair of function symbols, occurring in said distinct search pattern to be a parent-parent pair, said parent-parent pair of function symbols further comprising a first parent function symbol and a second parent function symbol, said parent-parent pair of function symbols being characterized by said first parent symbol and said second parent symbol being independently applied to two distinct occurrences of a common pattern variable in said distinct search pattern; and
   an equivalence detector means for detecting when said merger of two or more equivalence classes results in some active argument of said first parent function symbol becoming equivalent to some active argument of said second parent function symbol.

50. The computer-implemented system of claim 49 wherein said comparator for determining a pair of function symbols occurring in said distinct search pattern to be a parent-parent pair further comprises a database including a global set of parent-parent pairs occurring in the active portion of said graph.

51. The computer-implemented system of claim 50 wherein said global set of parent-parent function pairs is realized using an approximate set.

52. The computer-implemented system of claim 51 wherein said approximate set is implemented using a hash function.

53. The computer-implemented system of claim 39 wherein said relevance identifier for identifying one or more search patterns as being relevant to the search for new matches being conducted in regions of said selectively modified graph is responsive to the activation of previously inactive nodes in said graph.

54. The computer-implemented system of claim 53 wherein said relevance identifier for identifying one or more regions of said selectively modified graph as being relevant to a search for a distinct search pattern responsive to the activation of previously inactive nodes in said graph further comprises the following:
   a database updater for updating a global set of parent-child pairs occurring in the active portion of said graph responsive to the activation of previously inactive nodes in said graph to include all parent-child pairs in the newly activated nodes;
   a database updater for updating a global set of parent-parent pairs occurring in the active portion of said graph responsive to the activation of previously inactive nodes in said graph to include all parent-parent pairs in the newly activated nodes; and
   a database maintainer for maintaining a global set of trivial parent elements occurring in the active portion of said graph and updating said global trivial parent set responsive to the activation of previously inactive nodes in said graph.

55. The computer-implemented system of claim 54 wherein said global set of trivial parent function elements is realized using an approximate set.

56. The computer-implemented system of claim 55 wherein said approximate set is implemented using a hash function.

57. The computer-implemented system of claim 39 wherein said relevance identifier for identifying one or more search patterns as being relevant to the search for new matches being conducted in regions of said selectively modified graph is responsive to the activation of new nodes in said graph.

58. The computer-implemented system of claim 57 wherein said relevance identifier for identifying one or more regions of said selectively modified graph as being relevant to a search for a distinct search pattern responsive to the activation of new nodes in said graph further comprises the following:

a data base updater for updating a global set of parent-child pairs occurring in the active portion of said graph responsive to the activation of new nodes in said graph to include all parent-child pairs in the newly activated nodes;

a database updater for updating a global set of parent-parent pairs occurring in the active portion of said graph responsive to the activation of new nodes in said graph to include all parent-parent pairs in the newly activated nodes; and a database maintainer for maintaining a global set of trivial parent elements occurring in the active portion of said graph and updating said global trivial parent set responsive to the activation of previously inactive nodes in said graph.

59. The computer-implemented system of claim 58 wherein said global set of trivial parent function elements is realized using an approximate set.

60. The computer-implemented system of claim 59 wherein said approximate set is implemented using a hash function.

61. A computer-implemented method for verifying the conformity of information with one or more rules, said method comprising the steps of:

transforming the information into one or more formulae testable against one or more of the rules;

generating an initial graph from each of said formulae, each said graph including a directed acyclic graph connecting a plurality of nodes;

converting each of said one or more rules into one or more distinct search patterns;

searching each node of each said initial graph for instances of said distinct search pattern and storing each identified instance; and repeating the following steps to thereby perform proving of the information as long as new instances of said one or more distinct search patterns are detected:

selectively modifying said graph;

identifying one or more search patterns as being relevant to a search of said selectively modified graph for new matches;

identifying one or more regions of said selectively modified graph as being relevant to the search for new matches with said one or more relevant search patterns; and searching the nodes only in said identified relevant regions of said selectively modified graph for instances only of said one or more relevant search patterns.

62. A computer-implemented method as in claim 61 wherein the selective modifying of said graph is performed recursively.

63. The computer-implemented method of clam 61 wherein the repeatedly performed proving is adaptive.

64. A computer-implemented system for verifying the conformity of information with one or more rules, said system comprising:

a verification condition generator configured for transforming at least a part of the information into one or more formulae that are amenable to automated testing against one or more of the rules;

a formula manager configured for generating an initial respective graph from each of said one or more formulae, each said graph including a directed acyclic graph connecting a plurality of nodes;

a pattern generator configured for converting each of said one or more rules into one or more distinct search patterns;

a prover for searching each node of each said initial graph for instances of said one or more distinct search patterns and storing each identified instance; and iteration means to perform proving of the information as long as new instances of said one or more distinct search patterns are detected, including:

a graph modifier for selectively modifying said graph;

a relevance identifier configured for identifying one or more search patterns as being relevant to a search of said selectively modified graph for new matches and further configured for identifying one or more regions of said selectively modified graph as being relevant to the search for new matches with said one or more relevant search patterns; and a pattern matcher configured for searching the nodes only in said identified relevant regions of said selectively modified graph for instances only of said one or more relevant search patterns.

\* \* \* \* \*

UNITED STATES PATENT AND TRADEMARK OFFICE
CERTIFICATE OF CORRECTION

PATENT NO. : 6,343,376 B1
DATED : January 29, 2002
INVENTOR(S) : Saxe et al.

It is certified that error appears in the above-identified patent and that said Letters Patent is hereby corrected as shown below:

Column 1,
Line 34 reads: "performed using a set of rules reduces to the task of"; it should read: -- performed using a set of rules reduced to the task of --;

Column 4,
Line 58 reads: "classes to the match process for a distinct search patterns is"; it should read: -- classes to the match process for a distinct search pattern is --;
Line 60 reads: "one of the parent function symbol becoming equivalent to"; it should read: -- one of the parent function symbols becoming equivalent to --;

Column 10,
Line 9 reads: "the source code isd depicted as block 500. Assuming that the"; it should read: -- the source code is depicted as block 500. Assuming that the --;

Column 23,
Line 47 reads: "maintain plbls, plbls, gpc, gpp, and gtp every time a node is"; it should read: -- maintain lbls, plbls, gpc, gpp, and gtp every time a node is --;

Column 25,
Line 65 reads: " distinct search pattern to he a parent-child pair, said"; it should read: --  distinct search pattern to be a parent-child pair, said --.

Signed and Sealed this

Twenty-eighth Day of May, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.      : 6,343,376 B1                                           Page 1 of 1
DATED           : January 29, 2002
INVENTOR(S)     : Saxe et al.

It is certified that error appears in the above-identified patent and that said Letters Patent is hereby corrected as shown below:

<u>Title page,</u>
Item [73], reads, Assignee: "Computer Computer Corporation," it should read --
Assignee: Compaq Computer Corporation --.

Signed and Sealed this

Thirteenth Day of August, 2002

Attest:

Attesting Officer

JAMES E. ROGAN
*Director of the United States Patent and Trademark Office*